US008051302B1

(12) United States Patent
Hatanaka et al.

(10) Patent No.: US 8,051,302 B1
(45) Date of Patent: Nov. 1, 2011

(54) DATA DISTRIBUTING SYSTEM AND RECORDING MEDIUM USED FOR IT

(75) Inventors: Masayuki Hatanaka, Kawasaki (JP);
Jun Kamada, Kawasaki (JP); Takahisa Hatakeyama, Kawasaki (JP); Takayuki Hasebe, Kawasaki (JP); Seigou Kotani, Kawasaki (JP); Takeaki Anazawa, Tokyo (JP); Tadaaki Tonegawa, Kodaira (JP); Junji Nakata, Kodaira (JP); Toshiaki Hioki, Ogaki (JP); Miwa Kanamori, Ogaki (JP); Yoshihiro Hori, Gifu (JP)

(73) Assignees: Fujitsu Limited, Kawasaki (JP); Sanyo Electric Co., Ltd., Moriguchi-shi (JP)

( * ) Notice: Subject to any disclaimer, the term of this patent is extended or adjusted under 35 U.S.C. 154(b) by 3165 days.

(21) Appl. No.: 10/129,950

(22) PCT Filed: Nov. 16, 2000

(86) PCT No.: PCT/JP00/08107
§ 371 (c)(1),
(2), (4) Date: Nov. 5, 2002

(87) PCT Pub. No.: WO01/37479
PCT Pub. Date: May 25, 2001

(30) Foreign Application Priority Data

Nov. 17, 1999 (JP) .................................. 11-327011

(51) Int. Cl.
*G06F 11/30* (2006.01)
(52) U.S. Cl. .............. 713/193; 726/27; 726/2; 380/242; 380/277

(58) Field of Classification Search .................. None
See application file for complete search history.

(56) References Cited

U.S. PATENT DOCUMENTS

| 5,651,066 A * | 7/1997 | Moriyasu et al. ............. 380/282 |
| 6,654,883 B1 * | 11/2003 | Tatebayashi .................. 713/168 |
| 2002/0032658 A1 | 3/2002 | Oki et al. |

FOREIGN PATENT DOCUMENTS

| CN | 1166029 A | 11/1997 |
| EP | 0 691 762 A2 | 1/1996 |
| EP | 0 809 244 A2 | 11/1997 |
| EP | 0 691 762 A3 | 12/1997 |
| EP | 0 840 194 A2 | 5/1998 |
| EP | 0 840 194 A3 | 10/1998 |
| JP | 8-186667 | 7/1996 |
| JP | 9-34841 | 2/1997 |

(Continued)

OTHER PUBLICATIONS

European Patent Office Communication dated Apr. 20, 2004 in Application No. 00 97 6310.

(Continued)

*Primary Examiner* — Pramila Parthasarathy
(74) *Attorney, Agent, or Firm* — Westerman, Hattori, Daniels & Adrian, LLP

(57) ABSTRACT

Encrypted music data and additional information necessary for accessing a server (30) are copied from a CD-ROM (200) onto a memory card (110). The memory card (110) receives via a digital portable phone network the distribution of a contents decoding key (Kc) necessary for decoding encrypted music data and control information data (AC1) for limiting the number of accesses to the memory card from the server (30).

12 Claims, 19 Drawing Sheets

FOREIGN PATENT DOCUMENTS

| | | |
|---|---|---|
| JP | 9-307543 | 11/1997 |
| JP | 10-40172 | 2/1998 |
| JP | 10-133955 | 5/1998 |
| JP | 10-293724 | 11/1998 |
| JP | 11-149709 | 6/1999 |
| JP | 11-154944 | 6/1999 |
| JP | 11-164058 | 6/1999 |
| JP | 11-203128 | 7/1999 |
| JP | 11-265317 | 9/1999 |

OTHER PUBLICATIONS

*Partial English Translation* of "Angou Riron Nyumon (Introduction of Cryptosystem Theory)" by Eiji Okamoto.

Kiyoshi Yamanaka, et al., "Multimedia on Demand System Service ni okeru Joho Hogo System", NTT R&D, vol. 44, No. 9 (1995), pp. 813-818, Especially, Fig. 3.

Seigo Kotani, et al., "Secure PC Card" FUJITSU, vol. 49, No. 3, (1998), pp. 246-249.

\* cited by examiner

FIG.2

| TITLE | FUNCTION・CHARACTERISTICS | HOLD・GENERATION POSITION |
|---|---|---|
| Data | CONTENT DATA: DISTRIBUTED VIA CD-ROMS AS ENCRYPTED CONTENT DATA ENCRYPTED TO ALLOW DECRYPTION WITH Kc AND TAKING THE FORM OF {Data}Kc, EX. MUSIC DATA, MOVIE DATA | CD-ROM |
| Data-inf | ADDITIONAL INFORMATION DATA: PLAIN TEXT INFORMATION RELATING TO COPYRIGHT OF CONTENT DATA, SERVER ACCESS, ETC | CD-ROM |
| Kc | CONTENT DECRYPTION KEY | DISTRIBUTION SERVER |
| Kp | DECRYPTION KEY UNIQUE TO CONTENT REPRODUCING PORTION | CELLULAR PHONE |
| KPp | DECRYPTION KEY DECODABLE WITH Kp: DECODED WITH PUBLIC DECRYPTION KEY KPma AND STORED IN MEMORY IN THE FORM OF {KPp}KPma HAVING AUTHENTICATION FUNCTION | CELLULAR PHONE |
| Kcom | DECRYPTION KEY COMMONLY USABLE IN DATA REPRODUCING DEVICES (CELLULAR PHONES): UTILIZED FOR TRANSMISSION OF Kc AND AC2 | DISTRIBUTION SERVER, CELLULAR PHONE |
| AC1 | CONTROL INFORMATION FOR MEMORY ACCESS (EX. RESTRICTIONS ON REPRODUCTION TIMES) | DISTRIBUTION SERVER |
| AC2 | CONTROL INFORMATION FOR RESTRICTION ON DATA REPRODUCING DEVICE | DISTRIBUTION SERVER |
| Km(i) | DECRYPTION KEY UNIQUE TO EACH MEMORY CARD | MEMORY CARD |
| KPm(i) | ENCRYPTION KEY DECODABLE WITH Km(i) | MEMORY CARD |
| Kmc | DECRYPTION KEY DEPENDING ON MEDIA (EX. KIND OF MEMORY CARD) | MEMORY CARD |
| KPmc | DECRYPTION KEY BEING DECODABLE WITH Kmc, AND RECORDED IN MEMORY CARD, TAKING THE FORM OF {KPmc}KPma HAVING AUTHENTICATION FUNCTION WHEN DECRYPTED WITH PUBLIC DECRYPTION KEY KPma. | MEMORY CARD |
| KPma | DECRYPTION KEY (PUBLIC) COMMONLY USABLE IN SYSTEM | DISTRIBUTION SERVER |
| Ks1 | SYMMETRIC KEY BEING UNIQUE TO SESSION AND GENERATED IN EVERY DISTRIBUTION SESSION | DISTRIBUTION SERVER |
| Ks2 | SYMMETRIC KEY BEING UNIQUE TO SESSION AND GENERATED IN EVERY DISTRIBUTION SESSION | MEMORY CARD |
| Ks3 | SYMMETRIC KEY BEING UNIQUE TO SESSION AND GENERATED IN EVERY REPRODUCTION SESSION | MEMORY CARD |
| Ks4 | SYMMETRIC KEY BEING UNIQUE TO SESSION AND GENERATED IN EVERY REPRODUCTION SESSION | CELLULAR PHONE |
| CONTENT ID | CODE FOR IDENTIFYING CONTENT DATA Data | CD-ROM |
| LICENSE ID | ADMINISTRATION CODE FOR SPECIFYING DISTRIBUTION OF LICENSE (TOGETHER WITH CONTENT ID IN SOME CASES) | DISTRIBUTION SERVER |

FIG.14

| TITLE | FUNCTION·CHARACTERISTICS | HOLD·GENERATION POSITION |
|---|---|---|
| Data | CONTENT DATA: DISTRIBUTED VIA CD-ROMS AS ENCRYPTED CONTENT DATA ENCRYPTED TO ALLOW DECRYPTION WITH Kc AND TAKING THE FORM OF {Data}Kc, EX. MUSIC DATA, MOVIE DATA | CD-ROM |
| Data-inf | ADDITIONAL INFORMATION DATA: PLAIN TEXT INFORMATION RELATING TO COPYRIGHT OF CONTENT DATA, SERVER ACCESS, ETC | CD-ROM |
| Kc | CONTENT DECRYPTION KEY | DISTRIBUTION SERVER |
| Kp | DECRYPTION KEY UNIQUE TO CONTENT REPRODUCING PORTION | CELLULAR PHONE |
| KPp | DECRYPTION KEY DECODABLE WITH Kp: DECODED WITH PUBLIC DECRYPTION KEY KPma AND STORED IN MEMORY IN THE FORM OF {KPp}KPma HAVING AUTHENTICATION FUNCTION | CELLULAR PHONE |
| AC1 | CONTROL INFORMATION FOR MEMORY ACCESS (EX. RESTRICTIONS ON REPRODUCTION TIMES) | DISTRIBUTION SERVER |
| AC2 | CONTROL INFORMATION FOR RESTRICTION ON DATA REPRODUCING DEVICE | DISTRIBUTION SERVER |
| Km(i) | DECRYPTION KEY UNIQUE TO EACH MEMORY CARD | MEMORY CARD |
| KPm(i) | ENCRYPTION KEY DECODABLE WITH Km(i) | MEMORY CARD |
| Kmc | DECRYPTION KEY DEPENDING ON MEDIA (EX. KIND OF MEMORY CARD) | MEMORY CARD |
| KPmc | DECRYPTION KEY BEING DECODABLE WITH Kmc, AND RECORDED IN MEMORY CARD, TAKING THE FORM OF {KPmc}KPma HAVING AUTHENTICATION FUNCTION WHEN DECRYPTED WITH PUBLIC DECRYPTION KEY KPma. | MEMORY CARD |
| KPma | DECRYPTION KEY (PUBLIC) COMMONLY USABLE IN SYSTEM | DISTRIBUTION SERVER |
| Ks1 | SYMMETRIC KEY BEING UNIQUE TO SESSION AND GENERATED IN EVERY DISTRIBUTION SESSION | DISTRIBUTION SERVER |
| Ks2 | SYMMETRIC KEY BEING UNIQUE TO SESSION AND GENERATED IN EVERY DISTRIBUTION SESSION | MEMORY CARD |
| Ks3 | SYMMETRIC KEY BEING UNIQUE TO SESSION AND GENERATED IN EVERY REPRODUCTION SESSION | MEMORY CARD |
| Ks4 | SYMMETRIC KEY BEING UNIQUE TO SESSION AND GENERATED IN EVERY REPRODUCTION SESSION | CELLULAR PHONE |
| CONTENT ID | CODE FOR IDENTIFYING CONTENT DATA Data | CD-ROM |
| LICENSE ID | ADMINISTRATION CODE FOR SPECIFYING DISTRIBUTION OF LICENSE (TOGETHER WITH CONTENT ID IN SOME CASES) | DISTRIBUTION SERVER |

DATA DISTRIBUTING SYSTEM AND RECORDING MEDIUM USED FOR IT

TECHNICAL FIELD

The present invention relates to a data distribution system, which supplies content information to terminals such as cellular phones, and distributes information for allowing reproduction of the content information.

BACKGROUND ART

By virtue of the progress in the Internet, information communication networks and the like, each of users can now easily access network information through a personal terminal employing a cellular phone or the like.

In such information communication, information is transmitted through digital signals. Therefore, each user can copy, e.g., music and video information transmitted via the aforementioned information communication network without degradation in the audio quality and picture quality. When any content data subject to copyright protection such as music data and image data is to be transmitted on the information communication network, copyrights of the copyright owner may be significantly infringed unless some appropriate measures to protect the copyrights are taken.

However, if copyright protection is given top priority so that distribution of content data over the disseminating digital information communication network is suppressed, the copyright owner who can essentially collect a predetermined copyright royalty for copies of a copyrighted work will also incur some disadvantages.

Instead of the distribution over the digital information communication network described above, distribution may be performed via record mediums storing digital data in a reproducible manner. In connection with the latter case, music data stored in CDs (Compact Disks) on the market can be freely copied in principle onto magneto-optical disks (e.g., MDs) as long as the duplication is only for the personal use. However, a personal user performing digital recording or the like indirectly pays predetermined amounts in prices of the digital recording device itself and the medium as guaranty moneys to a copyright owner.

Further, the user can copy the music data from a CD to an MD, but cannot copy it from an MD to another MD.

In view of the above, sufficient measures must be taken for the copyright protection when distributing the content data such as music data and image data taking the form of digital information to the public.

For example, a copyright owner or the like may wish to distribute music data in an appropriate distribution manner to an indefinite number of users, e.g., for sales promotion of new songs or tunes. However, if reproducible music data were simply distributed without reservations or restrictions over the digital information communication network, the copyright owner would be unable to collect charges from users without difficulty.

After a user receives the above music data, it is necessary to prevent unrestricted production of duplications in a reproducible form.

For another distribution system of music data, experiments are being conducted on operation of automatic dispensers or vending machines of music data to be located in railway stations, convenience stores and others. In this system, the music data is distributed to the automatic dispensers over a digital information communication network, and users can purchase the music content information from the automatic dispenser.

For selling the music data in the above automatic dispensers, the music data is recorded on a writable record medium such as a MD. Assuming that tens of seconds are required for recording one tune or song, a user who is purchasing about ten tunes at a time must wait several minutes for the purchase.

DISCLOSURE OF THE INVENTION

The present invention has been made for overcoming the above disadvantages, and it is an object of the invention to provide a data distribution system, which can supply music content data to users capable of data transmission over an information communication network, e.g., of cellular phones while securing copyrights.

Another object of the invention is to provide a record medium, which allows supply of music content data to users capable of data transmission over an information communication network, e.g., of cellular phones while securing copyrights.

Still another object of the invention is to provide a data distribution system, which can prevent unrestricted reproduction and unrestricted duplication of distributed content data without proper authorization from a copyright owner.

For achieving the above objects, the invention provides a data distribution system for distributing decryption information data for use in decryption processing of encrypted content data prepared by encrypting content data to be distributed to a plurality of users, including a record medium, a distribution server and a terminal device. The record medium bears the encrypted content data and plain-text additional information data for obtaining decryption information data to be used for decryption processing of the encrypted content data. The distribution server distributes the decryption information data over an information transmission network. The terminal device receives the decryption information data from the distribution server specified based on the plain-text additional information data over the information transmission network, and stores the received decryption information data. The terminal device includes a data storing portion configured to duplicate and store the encrypted content data and the plain-text additional information data recorded on the record medium, and to receive and store the decryption information data, and being removably attached to the terminal device, an interface attached to the data storing portion for transmitting data to and from the data storing portion, a specifying portion for specifying the distribution server based on the plain-text additional information data duplicated together with the encrypted content data for receiving the decryption information data for the encrypted content data stored in the data storing portion, and a receiving portion for transmitting the data to and from the distribution server specified by the specifying portion over the information transmission network, and receiving the decryption information data.

The data storing portion includes a first encrypting and communicating portion for outputting a first key unique to the data storing portion in a write processing of receiving and storing the decryption information data from outside the data storing portion, and operating, in a read processing of outputting the stored decryption information data to outside the data storing portion, to receive a second key from a providing party providing the stored decryption information data, and to encrypt and output at least a portion of the stored decryption information data; a first storing portion for storing the encrypted content data and the plain-text additional information data; and a second storing portion for storing the decryption information data. The distribution server includes a send/receive portion for externally transmitting the data over the information transmission network; and a second encrypting and communicating portion for receiving the first key from the data storing portion attached to the terminal device via the send/receive portion, encrypting the decryption information data with the first key and sending the same.

Preferably, the data storing portion is a memory card.

According to another aspect of the invention, a distribution server for receiving encrypted content data and plain-text additional information data for obtaining decryption information data for use in decryption processing of the encrypted content data from a record medium bearing the encrypted content data and the plain-text additional information data, and distributing the decryption information data to a plurality of terminal devices each storing the decryption information data received over an information transmission network, includes a send/receive portion and an encrypting and distributing portion. The send/receive portion is specified based on the plain-text additional information data, and is coupled to the information transmission network to allow access from each of the terminal devices. The encrypting and distributing portion receives a distribution request for the decryption information data sent from each of the terminal device and a first key sent from the data storing portion attached to the terminal device, encrypts the decryption information data with the first key, and distributes the encrypted decryption information data to the terminal device sending the distribution request via the send/receive portion and over the information transmission network.

According to still another aspect of the invention, a terminal device for receiving encrypted content data and plain-text additional information data for obtaining decryption information data for use in decryption processing of the encrypted content data from a record medium bearing the encrypted content data and the plain-text additional information data, storing the received data, and receiving the decryption information data from a distribution server over an information transmission network, includes a data storing portion, an interface, a specifying portion and a receiving portion.

The data storing portion receives the encrypted content data and the plain-text additional information data from the record medium for duplication and storage, receives the decryption information data to store the same, and is removably attached to the terminal device. The interface is attached to the data storing portion for transmitting data to and from the data storing portion. The specifying portion specifies the distribution server based on the plain-text additional information data duplicated together with the encrypted content data for receiving the decryption information data for the encrypted content data stored in the data storing portion. The receiving portion transmits the data to and from the distribution server specified by the specifying portion over the information transmission network, and receives the decryption information data. The data storing portion includes a first encrypting and communicating portion for outputting a first key unique to the data storing portion in a write processing of receiving and storing the decryption information data from outside the data storing portion, and operating, in a read processing of outputting the stored decryption information data to outside the data storing portion, to receive a second key from a providing party providing the stored decryption information data, and to encrypt and output at least a portion of the stored decryption information data, a first storing portion for storing the encrypted content data and the plain-text additional information data, and a second storing portion for storing the decryption information data.

According to yet another aspect of the invention, a memory card drive device for transferring, to a memory card, data read from a record medium bearing encrypted content data, plain-text additional information data, specifying data for specifying a plurality of predetermined unique keys and decryption information data encrypted into a decodable form with the unique key corresponding to the specifying data, includes a unique key holding portion and a unique key decryption processing portion.

The unique key holding portion holds the plurality of unique keys selectively designated by the specifying data. The unique key decryption processing portion decrypts the encrypted decryption information data obtained from the record medium with the unique key corresponding to the specifying data obtained from the record medium, and accepts the decryption information data. The accepted decryption information data is transferred to the memory card based on the fact that at least the memory card drive device can accept the decryption information data.

According to further another aspect of the invention, a disk-like record medium for use in a data distribution system for distributing encrypted content data to a plurality of users, and distributing decryption information data to be used for decryption of the encrypted content data over an information transmission network, includes a first region bearing the encrypted content data, a second region bearing additional information data in plain text providing information for obtaining the decryption information data to be used for the decryption of the encrypted content data, a third region bearing specifying data for specifying the plurality of unique keys predetermined in the data distribution system, and a fourth region bearing the decryption information data restricting reproduction of the encrypted content data corresponding to the encrypted content data encrypted into a decodable form with the unique key corresponding to the specifying data.

According to the distribution system of the invention, music content data can be easily supplied to users, who can transmit data over an information communication network of, e.g., cellular phones, while securing copyrights, and each user can start reproduction of the music within a short time. By using the record medium according to the invention, music content data can be easily supplied to users, who can transmit data over an information communication network of, e.g., cellular phones, while securing copyrights, and each user can start reproduction of the music within a short time. Further, it is possible to prevent duplication of the distributed decryption information data without authorization from a copyright owner.

BRIEF DESCRIPTION OF THE DRAWINGS

FIG. 2 represents characteristics of key data, license information and others used for communication in the data distribution system shown in FIG. 1;

FIG. 14 represents characteristics of key data, license information data and others used for communication in a data distribution system in a third embodiment;

BEST MODES FOR CARRYING OUT THE INVENTION

First Embodiment

[Whole Structure of System]

Figure 1:
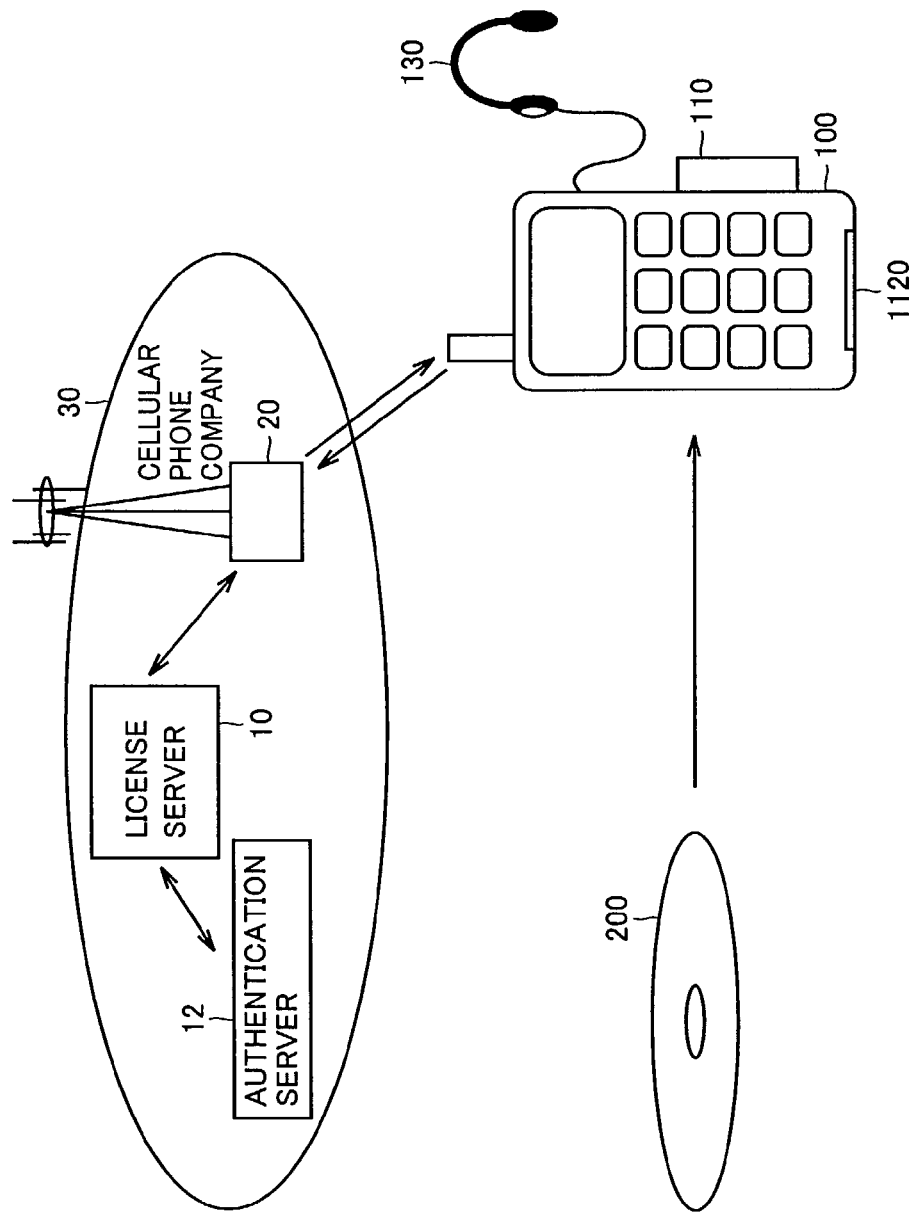
FIG. 1 conceptually shows a whole structure of a data distribution system according to the invention.

FIG. 1 conceptually shows a whole structure of a data distribution system according to the invention.

The following description is given by way of example on a structure of a data distribution system for distributing music data to respective users over a cellular phone network. However, as will be apparent from the following description, the invention is not restricted to such a case, and can be applied to the cases for distributing another kind of content data protected by copyright such as image information over another kind of information communication network.

A data reproducing device, which will now be described by way of example, is formed of a cellular phone provided with a data reproducing function. As will be apparent from the following description, the invention is not restricted to the cellular phone, and can be applied to various data reproducing devices provided that the device can be connected to an information communication network for obtaining information data required for reproducing music data.

Referring to FIG. 1, a user 1 using a cellular phone 100 has a record medium such as a CD-ROM (Compact Disk Read Only Memory) 200, which was distributed to the user and has a first memory region bearing encrypted music data and a second memory region for bearing plain text of additional information data such as a copyright related to this music data and access conditions of a server. These conditions will be described later. Since the music data on CD-ROM 200 is in the encrypted form as described above, cellular phone user 1 cannot reproduce the music data without decryption.

Cellular phone 100 of cellular phone user 1 is provided with a connector 1120 for receiving the encrypted music data and the plain-text additional information data recorded on CD-ROM 200 from a personal computer (not shown), which can read these data. A memory card 110 is removably attached to cellular phone 100. Memory card 110 can store the encrypted music data and the plain-text additional information data, and can perform predetermined processing for decrypting the encrypted music data to allow reproduction of music by a music producing portion (not shown) in cellular phone 100. Cellular phone 100 also has a structure connectable to headphones 120 for listening to reproduced music by cellular phone user 1.

A license server 10, which administers information for allowing reproduction of copyrighted music data on the user side, encrypts license information data for representing a content decryption key, which is used for decrypting the encrypted music data, and restrictions imposed on music reproduction by the copyright owner side, and applies the encrypted license information data to a cellular phone company 20, which is a distribution carrier for distribution. An authentication server 12 determines whether a user accessing it for requesting distribution of the music data is a regular user having regular cellular phone 100 and memory card 110 or not.

Cellular phone company 20 relays over its own cellular phone network a distribution request sent from each user to license server 10. When the distribution is requested, license server 10 encrypts the requested license information data and others after confirming by authentication server 12 that the user is using the regular cellular phone and the regular memory card. Then, license server 10 distributes the encrypted data and others to the cellular phone of the user over the cellular phone network of cellular phone company.

In the following descriptions, license server 10, authentication server 12 and cellular phone company 20 are collectively referred to as a "distribution server 30" hereinafter.

Processing of sending the license information data and others from such distribution server 30 to each cellular phone terminal or the like will be referred to as "distribution" hereinafter.

Owing to the above structure, only the regular cellular phone (content data reproducing device) and memory card, which can protect the copyright in this data distribution system, can receive the license information data from distribution server 30, and can reproduce the distributed music data.

Further, distribution carrier 20 may be configured to take count of operations, each of which is performed for distributing license information data of, for example, one song, and cellular phone company 20 may collect the charges for telephone calls of the cellular phone together with the charges of the decryption information data including the copyright royalty fee. Thereby, the copyright owner can easily ensure the royalty fee.

According to the structure shown in FIG. 1, the followings are required in the system for allowing reproduction of the music data (content data), which is distributed in the encrypted form, on the user side. First, a manner of encrypting the music content data is required, Second, a manner of distributing an encryption key in music reproduction is required, Third, a structure for achieving data protection by preventing unrestricted reproduction and others of the distributed data is required.

[Structures of Encryption/Decryption Keys]

FIG. 2 represents characteristics of keys, license information data and others used for communication in the data distribution system shown in FIG. 1. In the following description, keys bearing reference characters, which start from "KP", are public keys.

In the structure shown in FIG. 1, the data recorded on CD-ROM 200 includes music data Data and additional information data Data-inf such as information relating to the copyright of the music data and information relating to access to the server.

Music data Data recorded on CD-ROM 200 takes the form of encrypted music data {Data}Kc prepared by encryption into a form, which allows decryption with a content decryption key Kc as will be described later. However, additional information data Data-inf is recorded in plain text. The expression "{Y}X" represents that data bearing this expression was prepared by converting data Y into an encrypted form decodable with a decryption key X.

Additional information data Data-inf contains a content ID, which is a code for identifying music data Data. Content ID is determined based on a name of a player of music data Data, a song title and others.

The keys and others held and/or generated in distribution server 30 include content decryption key Kc, which is a decryption key for reproducing the music data, a first control information data AC1 for instructing, e.g., restrictions on the times of reproduction when content decryption key Kc or the like stored in memory card 110 is accessed, a second control information data AC2 for designating the reproduction conditions on the data reproducing device such as cellular phone 100, a public authentication key KPma, which is commonly usable in the system, a unique symmetric key Ks1 updated upon every distribution of the license information data or the like from distribution server 30, and license ID of an administration code for specifying the distribution of license.

The reproduction conditions designated by second control information data AC2 restrict the reproduction by the data reproducing device, and allow reproduction, e.g., of only a part of music data, only several phrases from the start or only for a limited period.

The license ID is a code, for example, for specifying a receiver of distributed content decryption key Kc and others for certain music data Data as well as the time of such distribution.

The license information data (decryption information data) collectively represents the license ID, content decryption key Kc, and first and second control information data AC1 and AC2.

Such a structure may be employed that symmetric key Ks1 is generated, e.g., upon every access to distribution server 30 by a user, and the same symmetric key Ks1 can be used regardless of the number of songs or tunes provided that the access has been made only one time. For example, such a structure may be employed that symmetric key Ks1 is changed for every song, and is sent to the user whenever such a change is made.

In the following description, the unit of such communication or access is referred to as "session", and the symmetric key to be updated for every session is referred to as a "session key".

Referring to FIG. 2 again, keys and others used for administering the data processing in cellular phone 100 includes a decryption key Kp unique to a type of cellular phone 100, a public encryption key KPp for performing encryption into a form decodable with decryption key Kp, and a session key Ks4 generated in cellular phone 100 for every session.

Public encryption key KPp is held by cellular phone 100 as signed data {KPp}KPma prepared by being encrypted together with additional data, which can be authenticated by decrypting it with public authentication key KPma. For transmission of content decryption key Kc and second control information data AC2 between distribution server 30 and cellular phone 100, the system uses decryption key Kcom commonly usable in all cellular phones 100 (data reproducing devices).

Referring to FIG. 2 again, the keys for administrating the data processing in memory card 110 include a private decryption key Km(i) (i: natural number) unique to each memory card, a public encryption key KPm(i) for performing encryption into a form decodable with private decryption key Km(i), a private decryption key Kmc, which uniquely depends on the kind of the medium (i.e., memory cards) and is different from those for other kinds of memory cards, a public encryption key KPmc for performing encryption allowing decryption with private decryption key Kmc, a session key Ks2 generated in memory card 110 for every distribution session, and a session key Ks3 generated in memory card 110 for every reproduction session.

The natural number i used in the expressions of "Km(i)" and "KPm(1)" indicating the keys is the number for distinguishing each memory card from the others. Further, public encryption key KPmc is held in memory card 110 as signed data {KPmc}KPma encrypted into the form decodable with public authentication key KPma having an authentication function.

[Structure of License Server 10]

Figure 3:
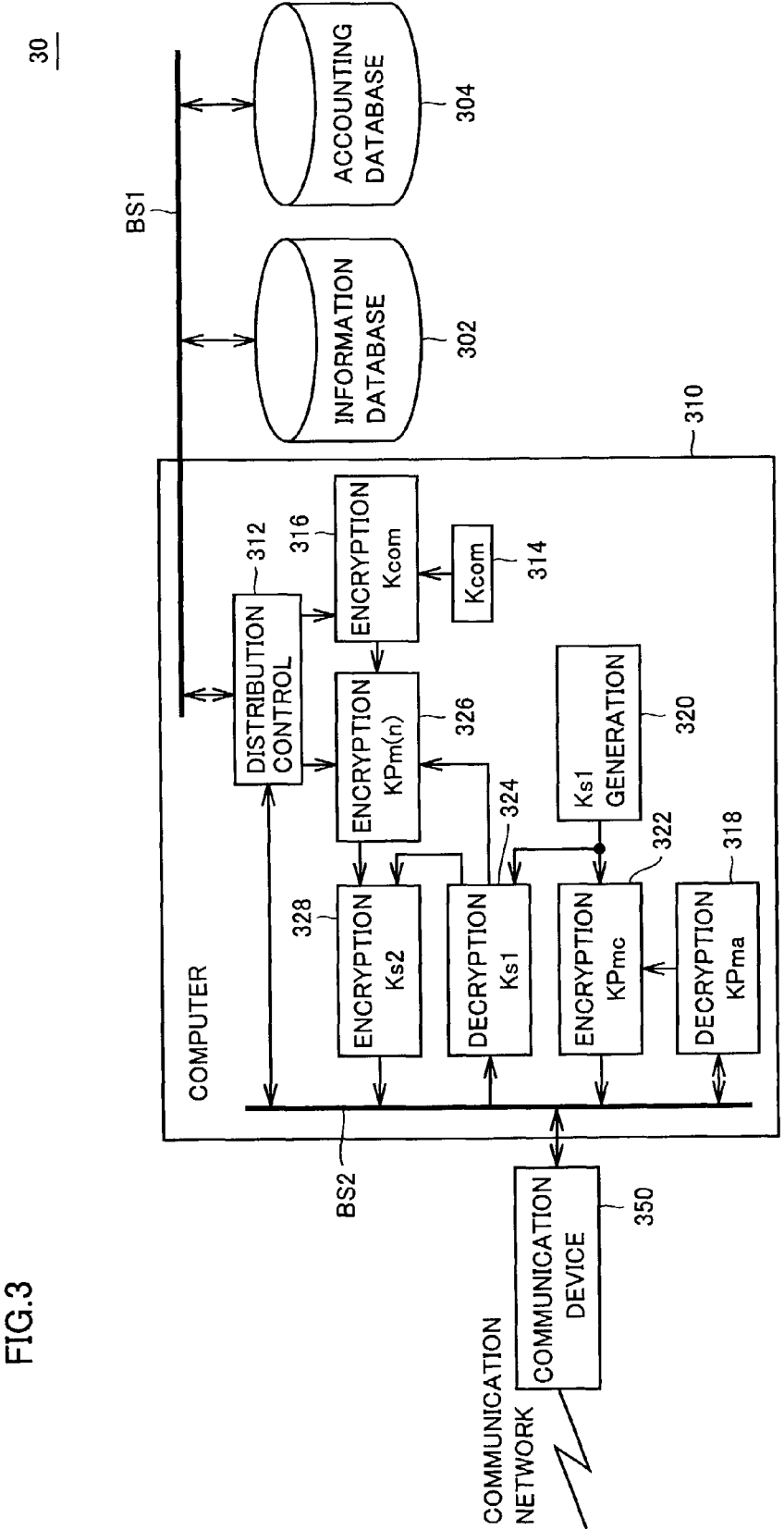
FIG. 3 is a schematic block diagram showing a structure of a license server 10 shown in FIG. 1.

FIG. 3 is a schematic block diagram showing a structure of license server 10 shown in FIG. 1. License server 10 includes a distribution information database 302 which holds keys for decrypting encrypted music data as well as distribution information such as additional information data, an accounting database 304 for holding accounting information depending on the times of distributions of the license information data for each user, a data processing portion 310, which receives data from distribution information database 302 and accounting database 304 via a data bus BS1, and performs predetermined encryption processing, and a communication device 350 for performing data transmission between distribution carrier 20 and data processing portion 310 over a communication network.

Data processing portion 310 includes a distribution control portion 312 for controlling an operation of data processing portion 310 in accordance with data on data bus BS1, a key holding portion 314 for holding decryption key Kcom commonly usable in the data reproducing devices, an encryption processing portion 316, which is controlled by distribution control portion 312 to encrypt content decryption key Kc and control information data AC2 for the data reproducing device with key Kcom, a decrypting portion 318 for receiving encrypted data {KPmc}KPma, which is sent, e.g., from memory cell data 110 of each user, from communication device 350 via a data bus BS2, and decrypting it to extract public encryption key KPmc, a session key generating portion 320 for generating session key Ks1, an encryption processing portion 322 for encrypting session key Ks1 produced by session key generating portion 320 with public encryption key KPmc extracted by decrypting portion 318, and applying it onto data bus BS2, a decryption processing portion 324 for receiving and encrypting the data, which is encrypted with session key Ks1 by the cellular phone of each user and is sent therefrom, via communication device 350 and data bus BS2, an encryption processing portion 326 for further encrypting the data sent from encryption processing portion 316 with public encryption key KPm(n), which is extracted by decryption processing portion 324, under control of distribution control portion 312, and an encryption processing portion 328 for further encrypting the output of encryption processing portion 326 with session key Ks2, which is extracted by decryption processing portion 324 based on the data sent from the memory card of each user after being encrypted with session key Ks1 in the memory card, and applying the data thus encrypted to communication device 350 via data bus BS2.

[Structure of Cellular Phone (Data Reproducing Device)]

Cellular phone 100 has an antenna 1102 for receiving radio signals sent over the cellular phone network, a send/receive portion 1104 for converting the signals received from antenna 1102 into baseband signals, and for sending data sent from cellular phone 100 to antenna 1102, a data bus DB3 for data transmission between various portions in cellular phone 100, a controller 1106 for controlling operations of cellular phone 100 via data bus BS3, a touch key unit 1108 for externally applying instructions to cellular phone 100, a display 1110 for giving information sent from controller 1106 or the like to the user as visible information, a voice reproducing portion 1112 for operating in an ordinary conversation operation to reproduce a voice from the received data sent via data bus BS3, a connector 1120 for external data transmission, and an external interface portion 1122, which can convert the data sent from connector 1120 into signals to be applied onto data bus BS3, and can convert the data applied from data bus BS3 into signals to be applied to connector 1120.

Cellular phone 100 further includes removable memory card 110 for storing content decryption key Kc and others sent from distribution server 30, a memory interface 1200 for controlling transmission of data between memory card 110 and data bus BS3, a key holding portion 1204 for holding public encryption key KPp unique to the data reproducing device, i.e., cellular phone 100 as signed data {KPp}KPma encrypted into a form, which allows authentication by decrypting it with public authentication key KPma, a key holding portion 1210 for holding decryption key Kp, which allows decryption of the data encrypted with key KPp, a decryption processing portion 1212 for decrypting session key Ks3, which is applied from memory card 110 via data bus BS3 and is encrypted with key KPp, with decryption key Kp, a session key generating portion 1502 for generating session key Ks4, e.g., based on a random number for encrypting the data to be transmitted via data bus DB3 when transmitting the data between memory card 110 and another portion in cellular phone 100, an encryption processing portion 1504 for encrypting session key Ks4 generated by session key generating portion 1502 with session key Ks3 extracted by decryption processing portion 1212, and applying the encrypted key onto data bus BS3, a decryption processing portion 1506 for decrypting the data on data bus BS3 with session key Ks4 for outputting it, a key holding portion 1510 for holding decryption key Kcom, a decryption processing portion 1520 which receives the output of decryption processing portion 1506 and decrypts it with key Kcom to extract content decryption key Kc and second control information data AC2, a decryption processing portion 1530 which receives the output of decryption processing portion 1520 and decrypts encrypted music data {Data}Kc read from the memory card, a music reproducing portion 1540 for receiving the output of decryption processing portion 1530 and reproducing music, a selector portion 1542 which receives the outputs of music reproducing portion 1540 and music reproducing portion 1112, and selectively outputs them depending on whether the current mode is a conversation mode or a music reproduction mode, and a connection terminal 1550 for receiving the output of selector portion 1542 and allowing connection of head phones 130.

Figure 4:
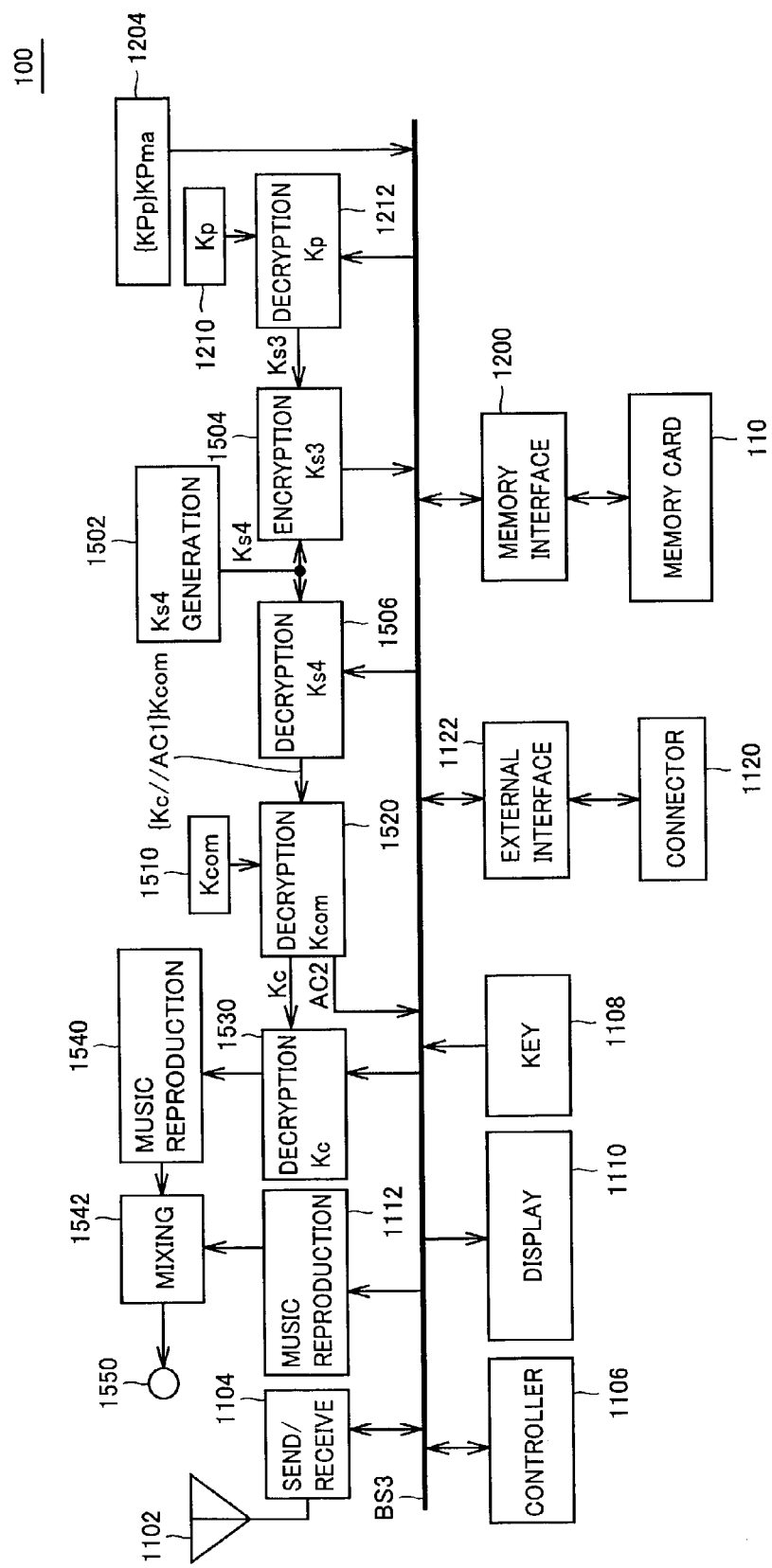
FIG. 4 is a schematic block diagram showing a structure of a cellular phone 100 shown in FIG. 1.

FIG. 4 shows only blocks relating to the distribution of music data according to the invention for the sake of simplicity, and does not show some of blocks related to an original conversation function of the cellular phone.

[Structure of Memory Card]

Figure 5:
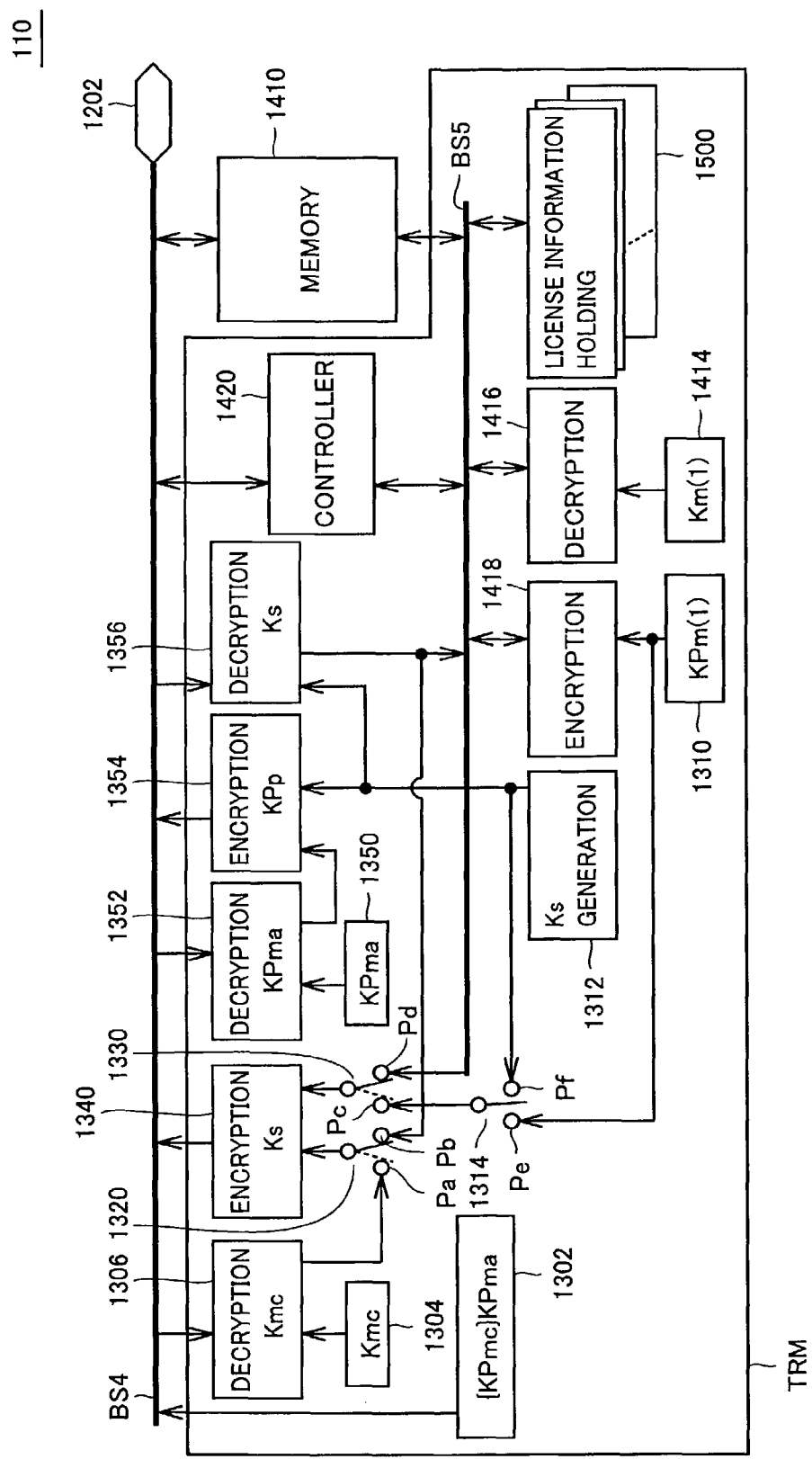
FIG. 5 is a schematic block diagram showing a structure of a memory card 110 shown in FIG. 4.

FIG. 5 is a schematic block diagram showing a structure of memory card 110 shown in FIG. 4.

In the following description, it is assumed that the number i for identifying memory card 110 is equal to one.

Memory card 110 includes a data bus BS4 for transmitting signals to and from interface 1200 via a terminal 1202, a KPmc holding portion 1302 for holding a value of data {KPmc}KPma, which is prepared by encrypting public encryption key KPmc with key KPma commonly usable in the system, and outputting data {KPmc}KPma onto data bus BS4, a Kmc holding portion 1304 for holding private decryption key Kmc corresponding to memory card 110, a decryption processing portion 1306 for extracting session key Ks1 from distribution server 30 by decrypting the data, which is applied onto data bus BS4 from memory interface 1200 via terminal 1202, with private decryption key Kmc, a KPm(1) holding portion 1310 for holding public encryption key KPm (1), a session key generating portion 1312 for generating a session key different from preceding and following session keys based on a random number, a select switch 1314 for receiving and selectively outputting the output of session key generating portion 1312 and the output of KPm(1) holding portion 1310, a select switch 1330 for receiving and selectively outputting the output of select switch 1314 and the data on a data bus BS5, and encryption processing portion 1340 for encrypting the output of select switch 1330 based on the session key, which is selected by select switch 1320 from session key Ks1 applied from distribution server 30 and session key Ks4 applied from cellular phone 100, and applying the encrypted output onto data bus BS4.

Memory card 110 further includes a KPma holding portion 1350 for holding public authentication key KPma, which is commonly usable in the system, a decryption processing portion 1352 for decrypting the data applied via data bus BS4 based on the output of KPma holding portion 1350, and extracting public encryption key KPp sent from cellular phone 100, an encryption processing portion 1354 for encrypting the output of session key generating portion 1312 based on public encryption key KPp, which is extracted by decryption processing portion 1352, and applying it onto data bus BS4, a decryption processing portion 1356 for decrypting the data on data bus BS4 with session key Ks2 or Ks3 sent from session key generating portion 1312, and applying it onto data bus BS5, and a memory 1410 for receiving content decryption key Kc and data such as additional information, which are encrypted double with key Kcom and public encryption key KPm(1) unique to each memory card, from data bus BS5 and storing them, and for receiving encrypted music data {Data}Kc, which is encrypted with content decryption key Kc, from data bus BS4, and storing it.

Select switch 1320 has contacts Pa and Pb, and receives session keys Ks1 and Ks4, which are output from decryption processing portions 1306 and 1356, on contacts Pa and Pb, respectively. Select switch 1320 selectively applies the signals received on contacts Pa and Pb to encryption processing portion 1340 depending on whether the operation is in the "distribution mode" or "reproduction mode".

Select switch 1330 has contacts Pc and Pd. The contact Pc receives from select switch 1314 the output of session key generating portion 1312 or the output of KPm(1) holding portion 1310. The contact Pd receives data {Kc//AC2}Kcom, which is prepared by encrypting content decryption key Kc and second control information data AC2 with key Kcom, from data bus BS5. Select switch 1330 selectively applies the signals received on contacts Pc and Pd to encryption processing portion 1340 depending on the current operation mode, i.e., "distribution mode" or "reproduction mode".

Memory card 110 further includes a Km(1) holding portion 1414 for holding a value of private decryption key Km(1), a decryption processing portion 1416 for decrypting at least content decryption key Kc, first and second control information data AC1 and AC2 and others, which are encrypted with public encryption key KPm(1), with private decryption key Km(1), and applying them onto data bus BS5, a decryption processing portion 1418 for operating in the distribution operation, which is performed for purchasing a license, to encrypt data {Kc//AC2}Kcom, which is output onto data bus BS5 from decryption processing portion 1416, with key KPm(1) and apply it to memory 1410, a controller 1420 for externally transmitting data via data bus BS4, receiving the license ID, content ID, first control information data AC1 and others from data bus BS5, and controlling the operation of memory card 110, and a license information holding portion 1500 for transmitting data via data bus BS5, and storing the license ID, content ID, first control information data AC1 and others.

The expression "{Y//Z}X" represents that data bearing this expression was prepared by converting data Y and Z into an encrypted form decodable with key data X.

License information holding portion 1500 includes a plurality of registers each corresponding to, e.g., music data stored in memory 1410, although not restricted to this.

A region surrounded by solid line in FIG. 5 is arranged within a module TRM, which is configured to erase internal data or destroy internal circuits for disabling reading of data and others in the circuits within this region by a third party when an illegal or improper access to the inside of memory card 110 is externally attempted.

This module is generally referred to as a tamper resistance module.

Naturally, memory 1410 may be located within module TRM. According to the structure shown in FIG. 5, however, the data held in memory 1410 is entirely encrypted so that the music cannot be reproduced only from such data. Therefore, it is not necessary to located memory 1410 within the expensive tamper resistance module so that a manufacturing cost can be low.

[Copying of Data from CD-ROM]

Figure 6:
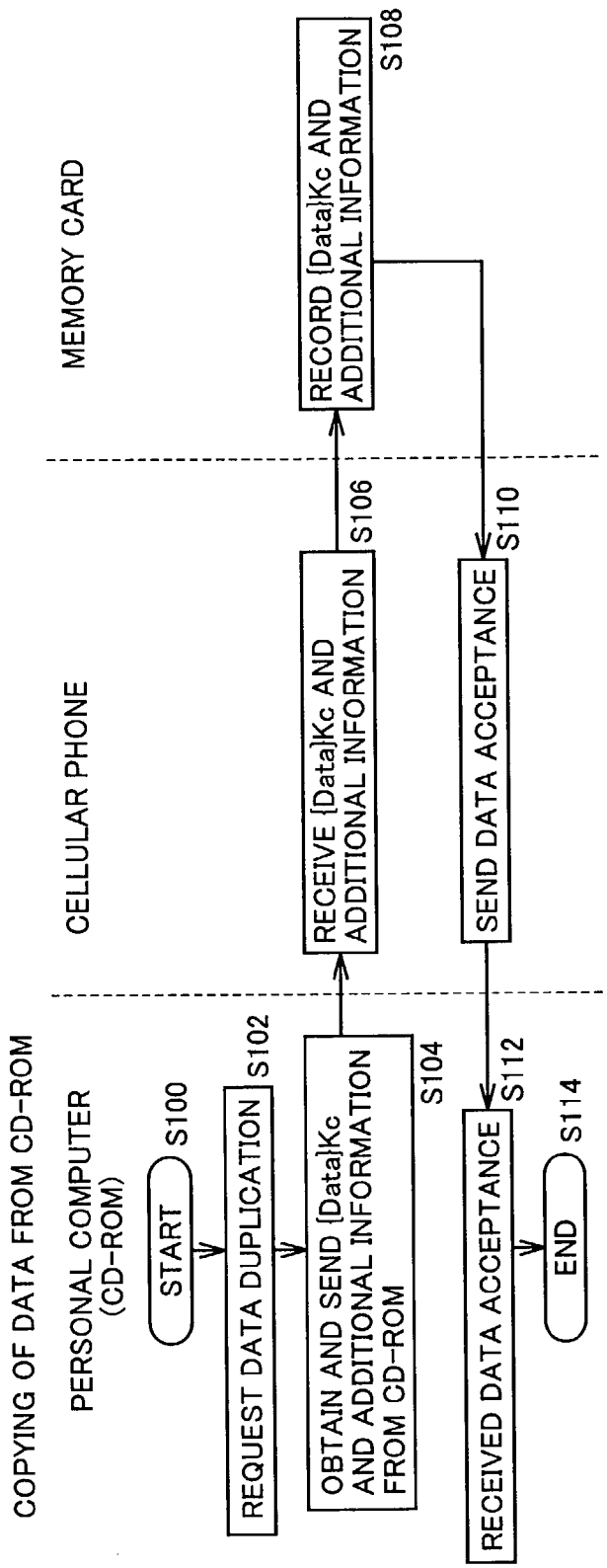
FIG. 6 is a flowchart showing an operation of copying data from CD-ROM 200 in the data distribution system.

FIG. 6 is a flowchart representing an operation of copying data from CD-ROM 200 in the data distribution system already described with reference to FIGS. 1 and 3-5.

In FIG. 6, CD-ROM 200 is already loaded into a CD-ROM drive of a personal computer, which is connected to cellular phone 100 via connector 1120.

A user enters a duplication request through a keyboard of the personal computer (step S102).

The personal computer obtains encrypted music data {Data}Kc and additional information data Data-inf from CD-ROM 200, and sends them to cellular phone 100 via connector 1120 (step S104).

When cellular phone 100 receives encrypted music data {Data}Kc and additional information data Data-inf (step S106), these data are stored in memory 1410 of memory card 110 (step S108).

When storage of data in memory card 110 is completed, cellular phone 100 sends the completion of data acceptance to the personal computer (step S110).

When the personal computer receives "data acceptance" from cellular phone 100 (step S112), it ends the processing (step S114).

[Purchasing (Distribution) of License]

Figure 7:
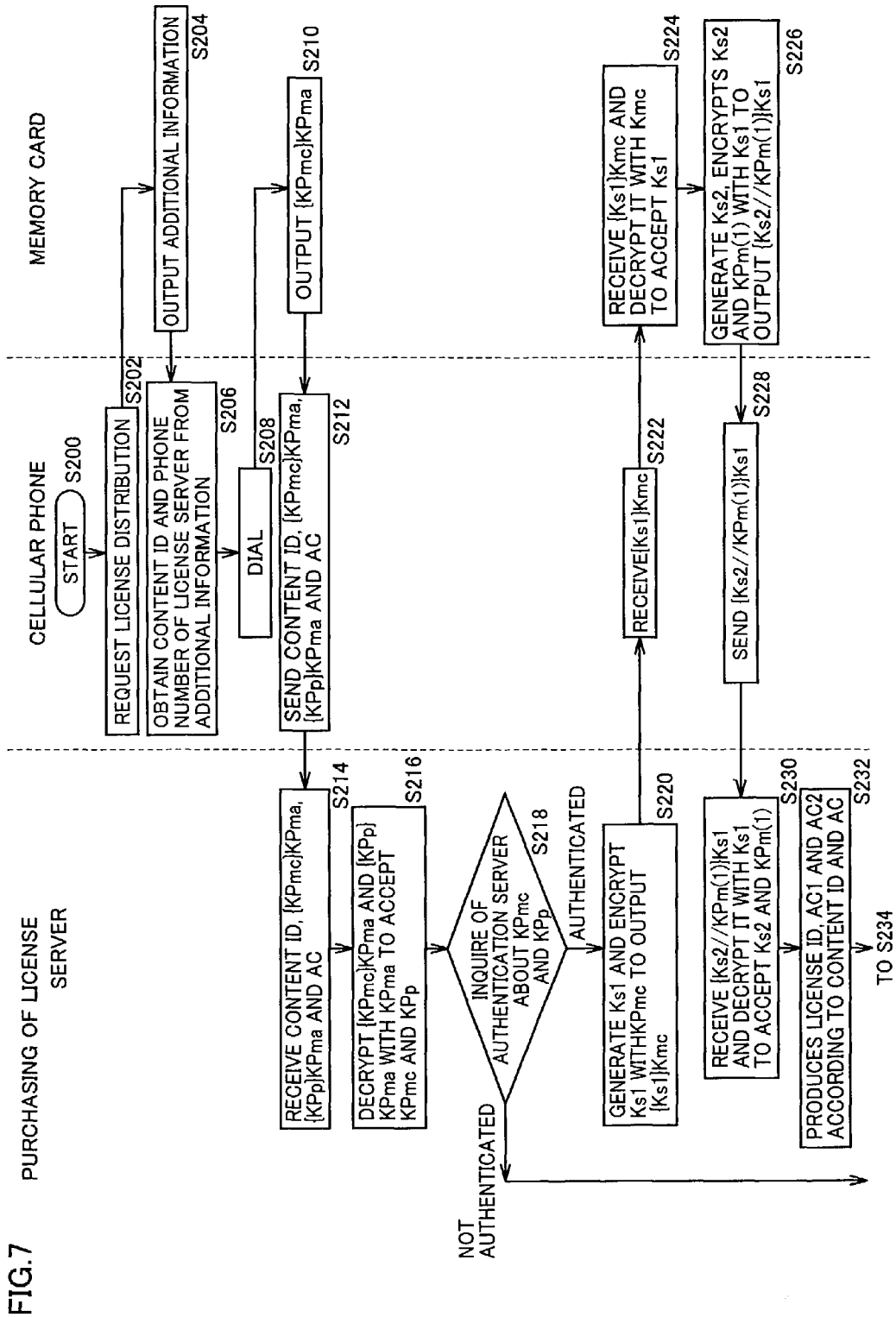
FIG. 7 is a first flowchart showing an operation of distributing license information data and others to cellular phone 100 over a cellular phone network.
Figure 8:
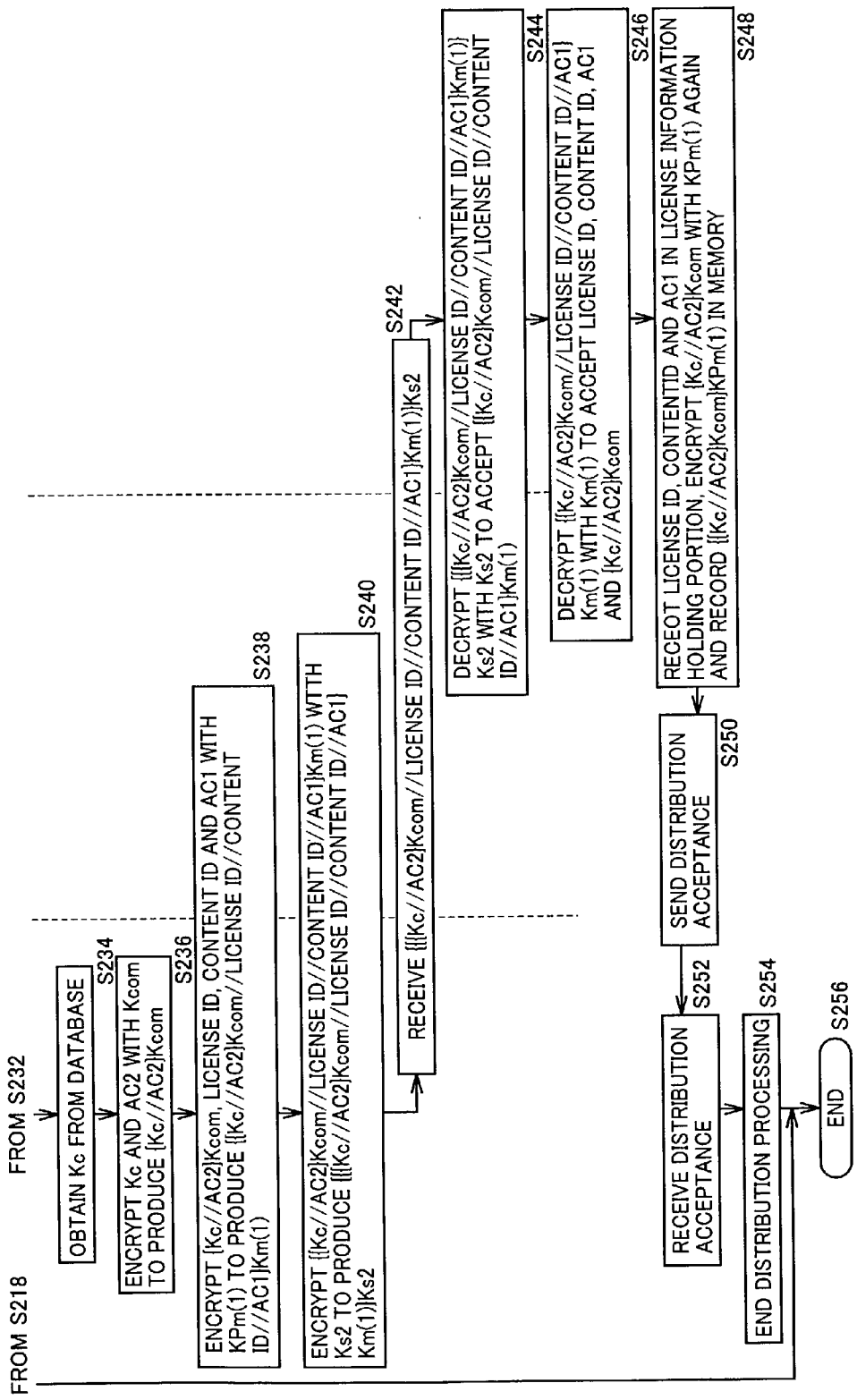
FIG. 8 is a second flowchart showing the operation of distributing the license information data and others to cellular phone 100 over the cellular phone network.

FIGS. 7 and 8 are first and second flowcharts representing an operation of distributing the license information data and others, which are used for reproducing the encrypted music data, to cellular phone 100 over cellular phone network 20 in the data distribution system already described with reference to FIGS. 1 and 3-5.

FIGS. 7 and 8 represent an operation, in which cellular phone 100 is used, and memory card 110 receives the license information data distributed from license server 10.

When the distribution processing starts (step S200), a user applies the license distribution request to cellular phone 100 via keys or buttons on touch key unit 1108 (step S202).

In response to this distribution request, memory card 110 outputs additional information data Data-inf corresponding to the encrypted music data already read from CD-ROM 200 (step S204).

In cellular phone 100, the content ID for designating the content to be distributed and a telephone number of license server 10 are obtained from additional information data Data-inf (step S206), and the number of license server 10 is dialed (step S208).

Memory card 110 sends signed data {KPmc}KPma, which is encrypted to allow authentication by decrypting it, from KPmc holding portion 1302 to cellular phone 100 (step S210).

Cellular phone 100 sends to distribution server 30 the content ID and signed data {KPmc}KPma obtained from memory card 110, signed data {KPp}KPma held in key holding portion 1204 and information AC indicating the request for the license applied from the user side (step S212).

Above information AC includes information of a request relating to a form or type of license purchase, and more specifically includes, for example, a request for allowing predetermined times of reproduction operations, or a request for allowing unrestricted reproduction.

When license server 10 receives content ID, signed data {KPmc}KPma and {KPp}KPma, and information AC from cellular phone 100 (step S214), decryption processing portion 318 decrypts signed data {KPmc}KPma and {KPp}KPma thus received based on public authentication key KPma to accept public encryption keys KPmc and KPp (step S218).

License server 10 sends an inquiry to authentication server 12 based on keys KPmc and KPp thus obtained (step S218), and the processing moves to a next step if the access is made by the regular cellular phone and the regular memory card (step S220). If the regular cellular phone and the regular memory card are not used, the processing ends (step S256).

When it is determined, as a result of the inquiry, that the access is made by the regular cellular phone and memory card, license server 10 operates to produce session key Ks1 by session key generating portion 320. Further, encryption processing portion 322 in license server 10 encrypts session key Ks1 with received public encryption key KPmc to produce data {Ks1}Kmc, and communication device 350 sends encrypted data {Ks1}Kmc received from encryption processing portion 322 to cellular phone 100 over the communication network (step S220).

When cellular phone 100 receives data {Ks1}Kmc (step S222), decryption processing portion 1306 in memory card 110 decrypts the data, which is sent onto data bus BS3 via memory interface 1200, with private decryption key Kmc, and thereby extracts decrypted session key Ks1 (step S224).

In the subsequent distributing operation, select switch 1320 is in the position closing contact Pa, and encryption processing portion 1340 receives session key Ks1 from decryption processing portion 1306 via contact Pa. Further, session key generating portion 1312 generates session key Ks2. Encryption processing portion 1340 receives session key Ks2 and public encryption key KPm(1) sent from KPm(1) holding portion 1310 via select switches 1314 and 1330, respectively, and encrypts them with session key Ks1 to produce data {Ks2//KPm(1)}Ks1 (step S226).

Cellular phone 100 sends data {Ks2//KPm(1)}Ks1 encrypted by encryption processing portion 1340 to distribution server 30 (step S228).

In license server 10, data {Ks2//KPm(1)}Ks1 is received by communication device 350, and is sent onto data bus BS2. Decryption processing portion 324 decrypts this data {Ks2//KPm(1)}Ks1 with session key Ks1 so that session key Ks2 and public encryption key KPm(1) are extracted in the decrypted forms (step S230).

In accordance with the content ID and information AC, distribution control portion 312 then produces the license ID and first and second control information data AC1 and AC2 based on the data held in distribution information database 302 and others (step S232).

Further, license server 10 obtains content decryption key Kc from distribution information database 302 (step S234).

In license server 10, encryption processing portion 316 encrypts content decryption key Kc and second control information data AC2 with key Kcom to produce data {Kc//AC2}Kcom (step S236). In distribution server 30, encryption processing portion 326 encrypts data {Kc//AC2}Kcom, license ID, content ID and first control information data AC1 with key KPm(1) to produce {{Kc//AC2}Kcom//license ID//content ID//AC1}Km(1) (step S238).

Further, encryption processing portion 328 encrypts data {{Kc//AC2}Kcom//license ID//content ID//AC1}Km(1) with session key Ks2 to produce data {{{Kc//AC2}Kcom//license ID//content ID//AC1}Km(1)}Ks2, and sends it to cellular phone 100 via communication device 350 (step S240).

When cellular phone 100 receives data {{{Kc//AC2}Kcom//license ID//content ID//AC1}Km(1)}Ks2 (step S242), memory card 110 first operates to decrypt received data {{{Kc//AC2}Kcom//license ID//content ID//AC1}Km(1)}Ks2 by decryption processing portion 1356 so that data {{Kc//AC2}Kcom//license ID//content ID//AC1}Km(1) is accepted (step S244).

Then, in memory card 110, decryption processing portion 1416 decrypts data {{Kc//AC2}Kcom//license ID//content ID//AC1}Km(1) with private decryption key Km(1) to accept data {Kc//AC2}Kcom, license ID, content ID and first control information data AC1 (step S246).

License ID, content ID and first control information data AC1 are stored in license information holding portion 1500, and data {Kc//AC2}Kcom is encrypted again with public encryption key KPm(1) by encryption processing portion 1414 to produce data {{Kc//AC2}Kcom}Km(1), which is stored in memory 1410 (step S248).

When an operation of storing data {{Kc//AC2}Kcom}Km(1) in memory 1410 ends, cellular phone 100 sends "distribution acceptance" to distribution server 30 (step S250).

When license server 10 receives the "distribution acceptance" (step S252), distribution server 30 performs distribution ending processing (step S254), e.g., by storing the accounting data of the owner of cellular phone 100 in accounting database 304, and the distribution processing ends (step S256).

Through the above operations, the license information data can be transmitted between memory card 110 and license server 10 after being encrypted with the session keys generated by memory card 110 and license server 10, and memory card 110 enters the state, in which the music data can be reproduced.

In the foregoing description, the server performs the authentication processing with signed data {KPp}KPma sent from key holding portion 1204 of cellular phone 100 in steps S212-S218. In another system, however, the terminal for receiving the distributed data may be different from the device for data reproduction. In this case, the authentication processing with signed data {KPp}KPma may be eliminated while leaving the authentication processing with signed data {KPmc}KPma on the memory card side.

[Reproducing Operation]

Figure 9:
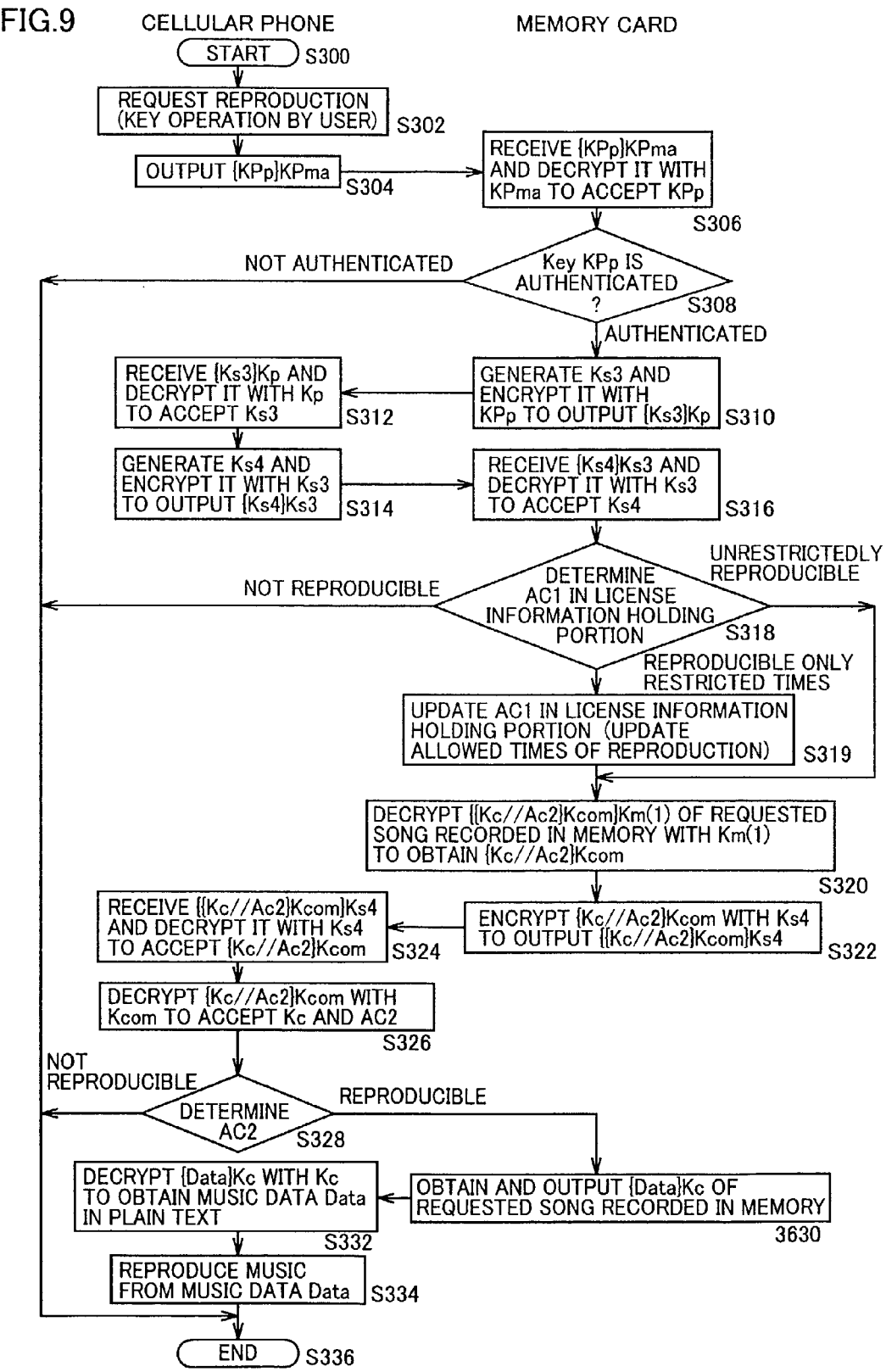
FIG. 9 is a flowchart representing reproduction processing for decrypting music data in cellular phone 100 and externally outputting it as music.

FIG. 9 is a flowchart representing the reproduction processing performed in cellular phone 100 for decrypting encrypted music data {Data}Kc held in memory card 110 to produce the decrypted music data, and externally reproducing music therefrom.

Referring to FIG. 9, when the reproduction processing starts (step S300), the reproduction request is applied in response to the instruction of user 1, which is entered via touch key unit 1108 or the like of cellular phone 100 (step S302). Thereby, cellular phone 100 operates to output signed data {KPp}KPma from key holding portion 1204 to memory card 110 (step S304).

In memory card 110, decryption processing portion 1352 decrypts data {KPp}KPma to accept key KPp (step S306).

Further, based on the results of decryption in step S306, it is determined whether key KPp is applied from a regular cellular phone or not (step S308). Thus, signed data {KPp}KPma has a certification function of determining whether key KPp is a regular key or not, based on results of additional data generated by decryption with public authentication key KPma. When it is determined that the authentication is impossible, the processing ends (step S336).

When the key can be authenticated, session key generating portion 1312 of memory card 110 generates session key Ks3, and encryption processing portion 1354 encrypts session key Ks3 with extracted public encryption key KPp to produce data {Ks3}KPp, and outputs it to cellular phone 100 (step S310).

When it is determined that the key can be authenticated, and memory card 110 sends data {Ks3}Kp, cellular phone 100 decrypts data {Ks3}Kp received from memory card 110 by decryption processing portion 1212, and accepts session key Ks3 (step S312).

Session key generating portion 1502 in cellular phone 100 produces session key Ks4, and encryption processing portion 1504 encrypts session key Ks4 with session key Ks3 to produce data {Ks4}Ks3, and outputs it to memory card 110 via data bus BS3 (step S314).

Memory card 110 receives data {Ks4}Ks3 produced and encrypted by cellular phone 100 via data bus BS3, and decryption processing portion 1356 decrypts it with session key Ks3 to extract session key Ks4 (step S316).

In memory card 110, controller 1420 determines whether the request is issued for the reproducible data or not, based on first control information data AC1 held by license information holding portion 1500, and also determines whether the allowed times of reproduction are restricted or not, if the data is reproducible (step S308). If the requested data is reproducible and the reproduction is allowed only restricted times, contents of first control information data AC1 in license information holding portion 1500 are updated to decrement the allowed times of reproduction by one (step S319). If it is determined that the data can be reproduced and the times of reproduction are not restricted, the processing moves to a step S320. When it is determined that the data cannot be reproduced, the processing ends (step S336).

In memory card 110, encrypted data {{Kc//AC2}Kcom}Km(1) corresponding to the requested song is read out from memory 1410, and is decrypted by decryption processing portion 1416 so that data {Kc//AC2}Kcom is obtained (step S320).

Further, encryption processing portion 1340 encrypts data {Kc//AC2}Kcom applied from data bus BS5 via select switch 1330 with session key Ks4 applied from decryption processing portion 1356 via select switch 1320, and outputs it to cellular phone 100 via data buses BS4 and BS3 (step S322).

Decryption processing portion 1506 in cellular phone 100 performs decryption with session key Ks4 to obtain data {Kc//AC2}Kcom (step S324). As a result of the decryption processing by decryption processing portion 1520, content decryption key Kc and second control information data AC2 are extracted (step S326).

Controller 1106 in cellular phone 100 determines contents of second control information data AC2 (step S328), and ends the processing when the data is not reproducible (step S336).

When the data is reproducible, controller 1106 in cellular phone 100 controls memory card 110 so that encrypted content data {Data}Kc corresponding to the requested song stored in memory 1410 of memory card 110 is read and output (step S330).

Music reproducing portion 1540 in cellular phone 100 decrypts encrypted content data {Data}Kc with extracted content decryption key Kc to produce the music data in plain text (step S332), and reproduces the content data to apply it to a selector portion 1542 (step S334). Selector portion 1542 externally outputs the reproduced music, and the processing ends (step S336).

The processing in steps S304-S312 is not necessarily required for every reproducing operation, and may be performed when the memory card is inserted or the power is turned on.

Owing to the above structure, music content information can be easily supplied to the user, who can transmit the data over the information communication network such as a cellular phone network, while securing the copyright, and the user can start the reproduction of music in a short time.

Further, it is possible to prevent unconditional reproduction and duplication of the distributed license (decryption) information data without authorization by the copyright owner.

In the foregoing description, it has been described that key Kcom is a symmetric key. However, the processing corresponding to the encryption processing with this key Kcom may be changed into processing using a public key. In this case, the encryption key is formed of a public key, and public key KPcom is used on the side of license server 10. Also, private decryption key Kcom is used on the side of reproducing circuit, i.e., cellular phone 100.

According to the description of the first embodiment, content decryption key Kc and second control information data AC2 in the license information data (license ID, content decryption key Kc, and first and second control information data AC1 and AC2) are recorded in memory 1410 after being encrypted. However, the invention is not restricted to the above, and such a structure may be employed that all the license information data are stored in license information holding portion 1500 without re-encryption in the memory card. This structure can reduce an overhead time before start of the reproduction, and can simplify software for controlling the controller in the memory card.

In the structure of the first embodiment, therefore, if license information storing portion 1500 stores all the license information data, encryption processing portion 1418 is not required in the structure of memory card 110 shown in FIG. 5. Further, the processing in step S248 shown in FIG. 8 is changed into processing, which is performed to "store data {Kc//AC2}Kcom, license ID, content ID and first control information data AC1 in license information holding portion 1500". Further, the processing in step S320 shown in FIG. 9 is changed into processing, which is performed to "obtain {Kc//AC2}Kcom of the requested song stored in license information holding portion 1500".

If an internal mechanism of the memory card is formed of one-chip LSI or the like, memory 1410 itself is formed within module TRM. In this case, a portion of memory 1410 may be used as license information holding portion 1500 so that license information holding portion 1500 thus formed can store {Kc//AC2}Kcom, license ID, content ID and first control information data AC1.

Modification of First Embodiment

In the structure of data distribution system of the first embodiment shown in FIG. 1, the operation of writing the encrypted music data and the additional information data from CD-ROM 200 to memory card 110 is performed via the personal computer by sending them through connector 1120 and cellular phone 100.

However, such a structure may be employed that a general-purpose memory card drive device connected to the personal computer takes the encrypted music data and others from CD-ROM 200 into memory card 110. Structures other than the above are substantially the same as those in the first embodiment, and therefore description thereof is not repeated.

The data distribution system of the structure described above can achieve substantially the same effect as the first embodiment.

Second Embodiment

Figure 10:
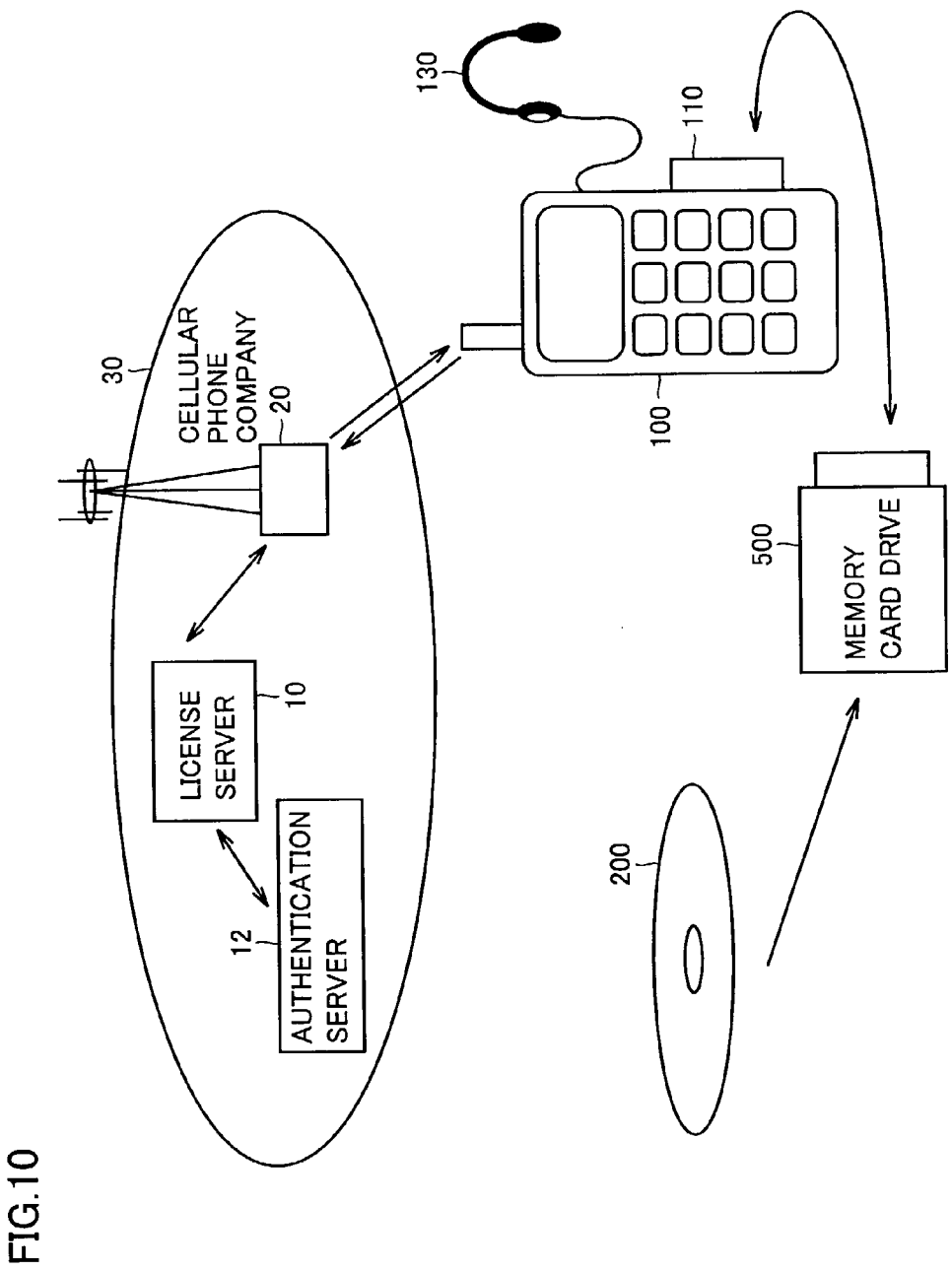
FIG. 10 conceptually shows a structure of a data distribution system of a second embodiment of the invention.

FIG. 10 conceptually shows a structure of a data distribution system according to a second embodiment of the invention. The structure in FIG. 10 differs from the structure of the data distribution system of the first embodiment in that the writing of the encrypted music data and additional information data from CD-ROM 200 into memory card 110 is performed without sending it by the personal computer via connector 1120 and cellular phone 100, but is performed by such a structure that a dedicated memory card drive device 500 connected to the personal computer writes the encrypted music data on CD-ROM 200 into memory card 110. Structures other than the above are substantially the same as those of the data distribution system of the first embodiment. Therefore, the same portions bear the same reference numbers, and description thereof is not repeated.

As will be apparent later from the description, memory card drive device 500 of the second embodiment differs from the structure of a general-purpose memory card drive device described in connection with the modification of the first embodiment, and has a structure adapted to the encrypting and decryption processing of the data transmitted to and from the memory card.

Figure 11:
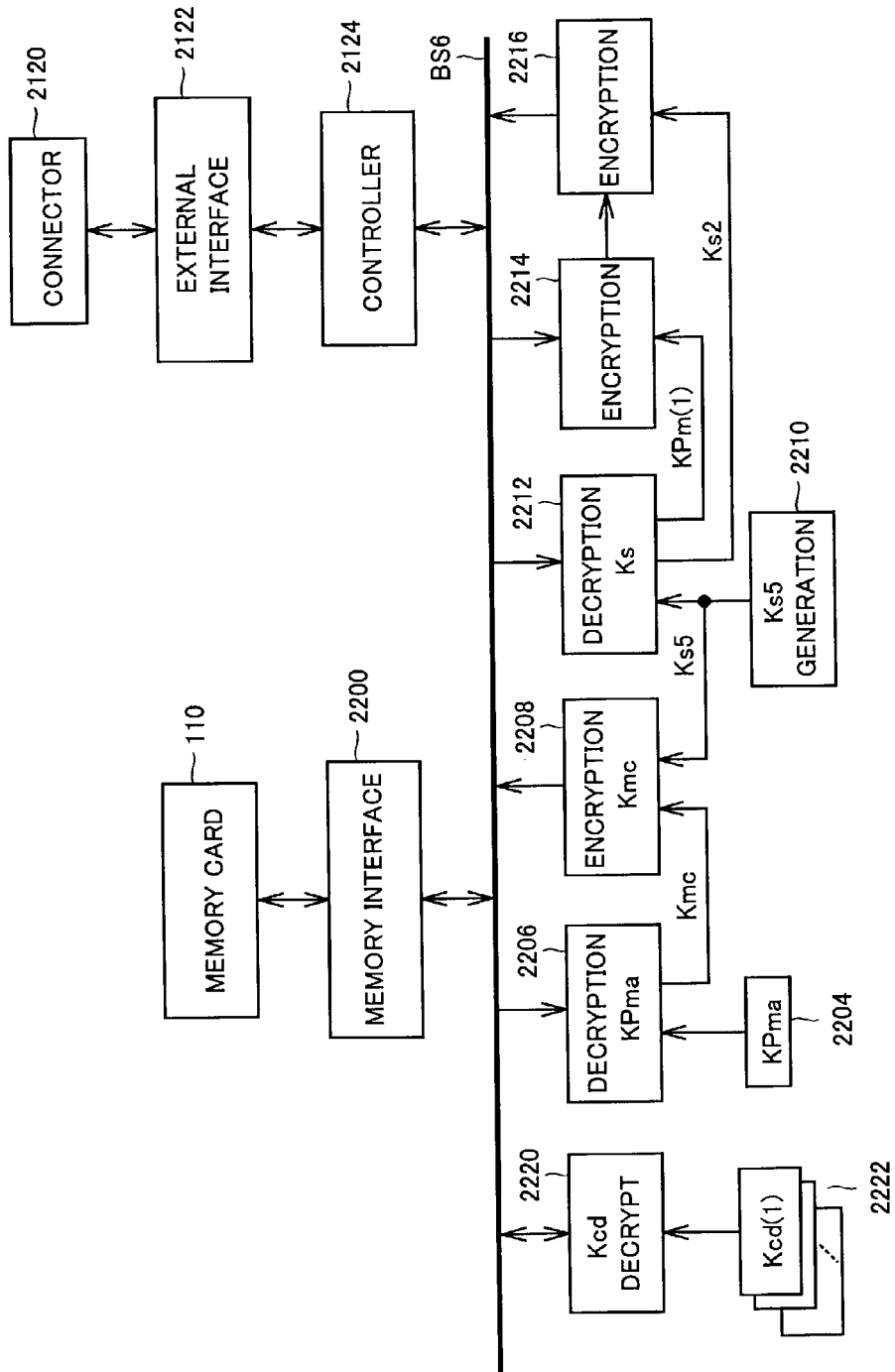
FIG. 11 is a schematic block diagram showing a structure of a memory card drive device 500 shown in FIG. 10.

FIG. 11 is a schematic block diagram showing a structure of memory card drive device 500 shown in FIG. 10. In the following description, a session key produced in memory card drive device 500 in response to every session is indicated by Ks5.

Referring to FIG. 11, memory card drive device 500 includes a connector 2120 for transmitting data to and from the personal computer, an external interface 2122 for converting the data sent from connector 2120 into signals to be applied into memory card drive device 500 and for converting the data obtained from memory card drive device 500 into signals to be applied to connector 2120, and a controller 2124 for controlling an operation of memory card drive device 500 in accordance with the data sent from external interface 2122.

Memory card drive device 500 further includes a memory interface 2200 for controlling data transmission between memory card 110 and a data bus BSG, a key holding portion 2204 for holding public authentication key KPma commonly usable in the system, a decryption processing portion 2206 for decrypting the data encrypted with public authentication key KPma applied from data bus BS6, a session key generating portion 2210 used in the data transmission between memory card 110 and another portion in memory card drive device 500 for generating session key Ks5, which is used for encrypting the data transmitted on data bus BS6, based on a random number or the like, an encryption processing portion 2208 for encrypting session key Ks5 produced by session key generating portion 2210 with public encryption key KPmc extracted by encryption processing portion 2206, and applying it onto data bus BS6, a decryption processing portion 2212 for decrypting the data on data bus BS6 with session key Ks5 and outputting the decrypted data, an encryption processing portion 2214 for receiving the output of decryption processing portion 2212 and encrypting the data sent from data bus BS6 with public encryption key KPm(1), an encryption processing portion 2216 for receiving the output of encryption processing portion 2214 and encrypting it with session key Ks 2 extracted by decryption processing portion 2212, a Kcd(j) holding portion 2222 for holding a plurality of keys Kcd(j) (j: natural number) unique to memory card drive device 500, and a Kcd decryption processing portion 2220 for decrypting the data on data bus BS6 with the key selected from the plurality of keys Kcd(j).

[Data Copying Operation]

Figure 12:
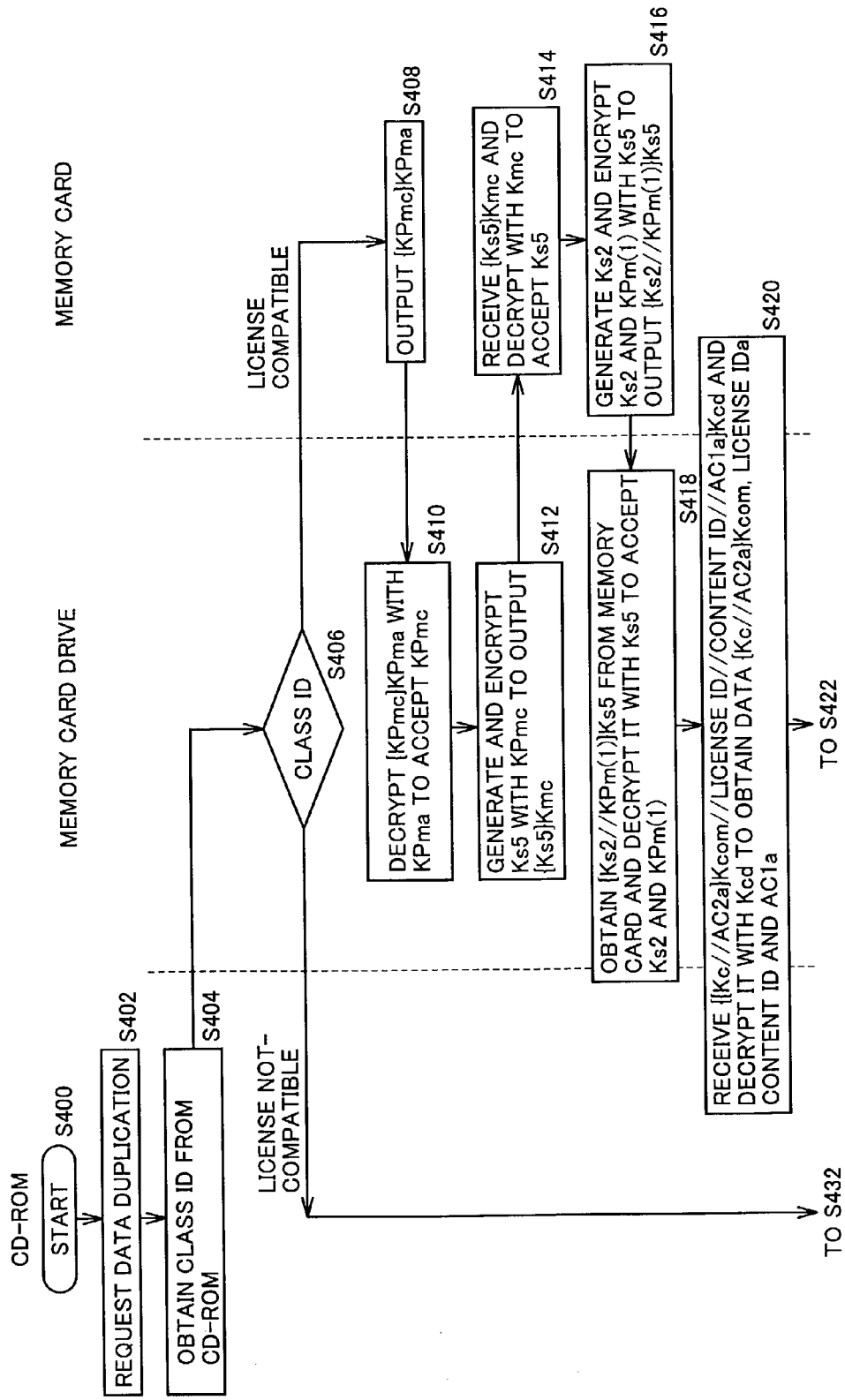
FIG. 12 is a first flowchart representing an operation of copying encrypted music data from CD-ROM 200 to memory card 110.
Figure 13:
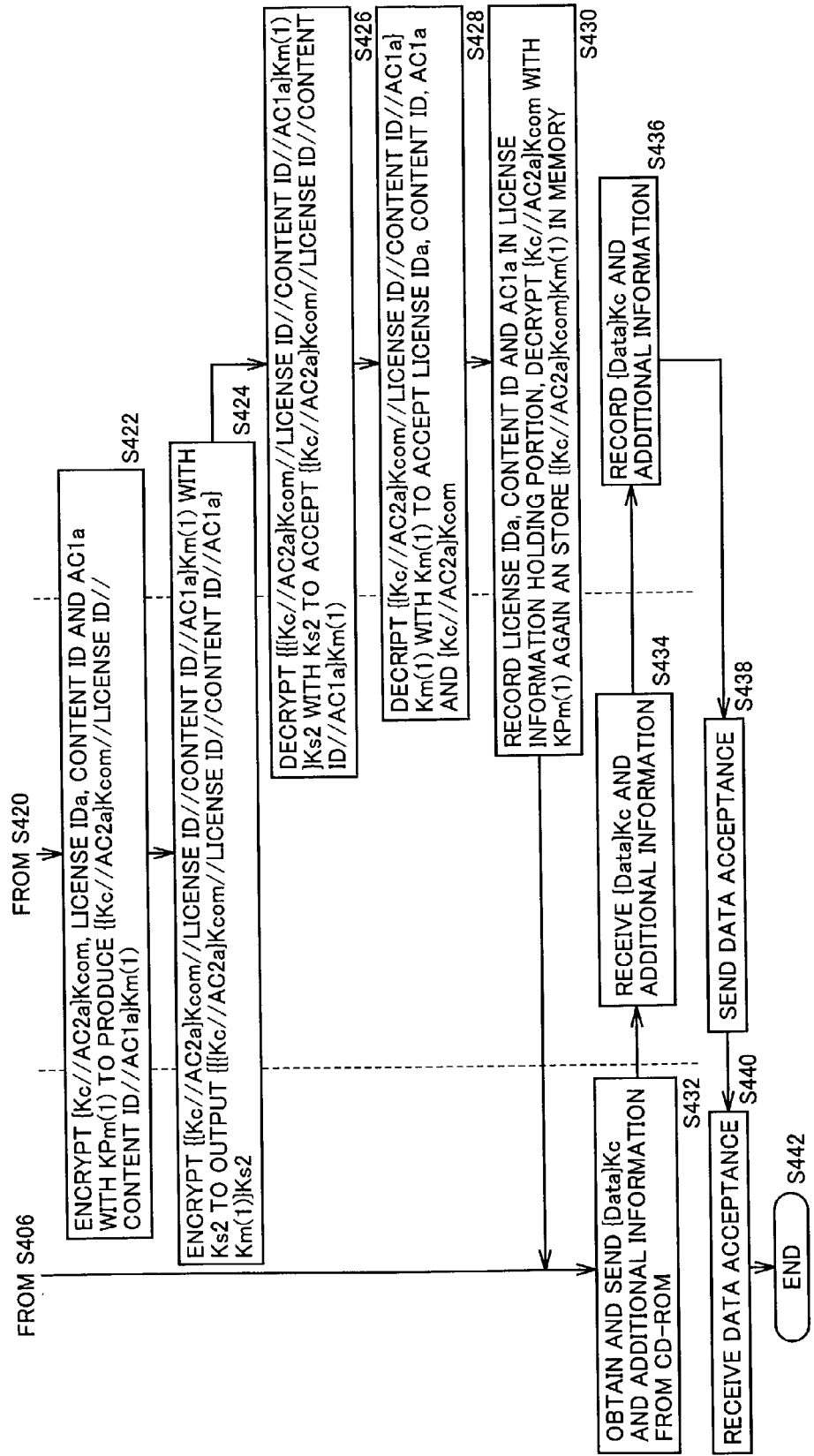
FIG. 13 is a second flowchart representing an operation of copying the encrypted music data from CD-ROM 200 to memory card 110.

FIGS. 12 and 13 are first and second flowcharts representing an operation of copying the encrypted music data from CD-ROM 200 to memory card 110 in the data distribution system already described in FIGS. 10 and 11.

Memory card 110 has substantially the same structure as that in the first embodiment. For transferring the license information data from CD-ROM 200 to memory card 110, it is first required to perform authentication between CD-ROM 200 and memory card drive device 500, as will be apparent from the following description. In the case where the data in CD-ROM 200 is license-corresponding data, memory card drive device 500 is allowed to copy the license information data on CD-ROM 200 to memory card 110 only if transmission of the data to and from memory card 110 is allowed in accordance with a predetermined manner, and thus, only if memory card 110 has a structure adapted to this data distribution system. In other words, authentication of the memory card 110 is performed depending on whether memory card drive device 500 can regularly operate as a distribution server in a false manner with respect to memory card 110.

In the following description, therefore, the license ID transmitted between memory card 110 and memory card drive device 500 is a provisional ID, which will be referred to as a "provisional license ID IDa". Further, first and second control information data AC1 and AC2 are indicated by reference characters "AC1a" and "AC2a" for representing that first and second control information data AC1 and AC2 are codes, on which restrictions are imposed, respectively. If the user wishes to have license information data not having such restrictions, the user can receive such data from the server as another data.

FIGS. 12 and 13 show the operations for copying the music data from CD-ROM 200 to memory card 110.

When the copying operation starts (step S400), copying of data is request, e.g., by operating keys of the personal computer (step S402).

The personal computer obtains class ID data from CD-ROM 200 (step S404). It is assumed that this class ID data specifies one key Kcd(j) in a Kcd(j) holding portion 2222.

Memory card drive device 500 determines based on the class ID whether CD-ROM 200 is compatible with memory card drive device 500 or not (step S406).

If CD-ROM 200 is not compatible with card drive device 500, the processing moves to a step S432.

If CD-ROM 200 is compatible, memory card 110 sends encrypted and signed data {KPmc}KPma from KPmc holding portion 1302 to memory card drive device 500 (step S408).

In memory card drive device 500, when signed data {KPmc}KPma transferred from memory card 110 is received, decryption processing portion 2206 decrypts signed data {KPmc}KPma thus received based on public authentication key KPma to accept public encryption key KPmc (step S410).

Thus, such a structure may be employed that memory card drive device 500 performs authentication of memory card 110, and, if not authenticated, (i) the processing is interrupted, or (ii) moves to a step S432.

Further, memory card drive device 500 operates to produce session key Ks5 by session key generating portion 2210. Further, encryption processing portion 2208 in memory card drive device 500 encrypts session key Ks5 with received key KPmc to produce data {Ks5}Kmc, and sends it to memory card 110 (step S412).

When memory card 110 receives data {Ks5}Kmc, decryption processing portion 1306 in memory card 110 decrypts it with key Kmc to extract session key Ks5 (step S414).

In memory card 110, select switch 1320 is in the position closing contact Pa, and encryption processing portion 1340 receives session key Ks5 from decryption processing portion 1306 via contact Pa. Further, session key generating portion 1312 generates session key Ks2. Encryption processing portion 1340 receives session key Ks2 and public encryption key KPm(1) sent from KPm(1) holding portion 1310 via select switches 1314 and 1330, respectively, and encrypts them with session key Ks5 to produce and output data {Ks2//KPm(1)}Ks5 (step S416).

In memory card drive device 500, data {Ks2//KPm(1)}Ks5 is received and applied onto data bus BSG. Decryption processing portion 2212 decrypts this data {Ks2//KPm(1)}Ks5 with session key Ks5 to extract session key Ks2 and public encryption key KPm(1) in the decrypted form (step S418).

Then, memory card drive device 500 receives data {{Kc//AC2a}Kcom//license IDa//content ID//AC1a}Kcd(j), which is recorded on CD-ROM 200, via the personal computer. Decryption processing portion 2212 first decrypts data {{Kc//AC2a}Kcom//license IDa//content ID//AC1a}Kcd(j) to obtain data {Kc//AC2a}Kcom, license IDa, content ID and first control information data AC1a (step S420).

If a correlation is not established between the class ID data obtained from CD-ROM 200 and key Kcd(j), memory card chive device 500 cannot obtain data {Kc//AC2a}Kcom, license IDa, content ID and first control information data AC1a.

Then, in memory card drive device 500, encryption processing portion 2214 encrypts data {Kc//AC2a}Kcom, license IDa, content ID and first control information data AC1a with public encryption key KPm(1) to produce {{Kc//AC2a}Kcom//license IDa//content ID//AC1a}Km(1) (step S422).

Subsequently, in memory card drive device 500, encryption processing portion 2216 encrypts {{Kc//AC2a}Kcom//license IDa//content ID//AC1a}Km(1) with session key Ks2 to produce and output {{{Kc//AC2a}Kcom//license IDa//content ID//AC1a}Km(1)}Ks2 (step S424).

In memory card 110, decryption processing portion 1356 decrypts data {{{Kc//AC2a}Kcom//license IDa//content ID//AC1a}Km(1)}Ks2 with session key Ks2 to accept data {{Kc//AC2a}Kcom//license IDa//content ID//AC1a}Km(1) (step S426).

In memory card 110, decryption processing portion 1416 decrypts data {{Kc//AC2a}Kcom//license IDa//content ID//AC1a}Km(1) with private decryption key Km(1) to accept data {Kc//AC2a}Kcom, license IDa), content ID) and first control information data AC1a (step S428).

License IDa, content ID and first control information data AC1a are stored in license information holding portion 1500, and data {Kc//AC2a}Kcom is encrypted again with public encryption key KPm(1) by encryption processing portion 1418 to store the encrypted data as data {{Kc//AC2a}Kcom}Km(1) in memory 1410 (step S430).

When storing of data {{Kc//AC2a}Kcom}Km(1) into memory 1410 ends, the personal computer obtains encrypted music data {Data}Kc and additional information data Data-inf from CD-ROM 200, and sends them to memory card drive device 500 via connector 2120 (step S432).

When memory card drive device 500 receives encrypted music data {Data}Kc and additional information data Data-inf (step S434), it stores them in memory 1410 of memory card 110 (step S436).

When storing of data into memory card 110 ends, memory card drive device 500 sends completion of the data acceptance to the personal computer (step S438).

When the personal computer receives "data acceptance" from memory card drive device 500 (step S440), the processing ends (step S442).

In the second embodiment, the operations of purchasing (distributing) the license and the reproduction operation can be performed similarly to the first embodiment.

Through the operations described above, the data can be copied from memory card 110 to CD-ROM 200. Further, effects similar to those of the first embodiment can be achieved after the encrypted music data is copied to memory card 110.

According to the above description of the second embodiment, content decryption key Kc and second control information data AC2a in the license information data (license IDa, content ID, content decryption key Kc and first and second control information data AC1a and AC2a) are encrypted for recording in memory 1410. However, the second embodiment may be configured to store all the license information data in license information holding portion 1500 without re-encryption in the memory card, similarly to the first embodiment.

Therefore, if the second embodiment is configured to store all the license information data in license information holding portion 1500, the processing in step S430 shown in FIG. 13 is changed into processing, which is performed to "store data {Kc//AC2a}Kcom, license IDa, content ID and first control information data AC1a in license information holding portion 1500".

If an internal mechanism of the memory card is formed of one-chip LSI or the like, a portion of memory 1410 may be used as license information holding portion 1500 so that license information holding portion 1500 thus formed may store data {Kc//AC2a}Kcom, license IDa, content ID and first control information data AC1a.

Third Embodiment

The data distribution system of a third embodiment is the same as the data distribution system of the first embodiment except for that key Kcom commonly usable in the cellular phones (data reproducing devices) is not employed in the third embodiment.

FIG. 14 represents characteristics of license information data and others used for communication in the data distribution system of the third embodiment, and corresponds to FIG. 12 representing the first embodiment.

As described above, the third embodiment differs from the first embodiment only in that key Kcom is not employed, and therefore, description thereof is not repeated.

Figure 15:
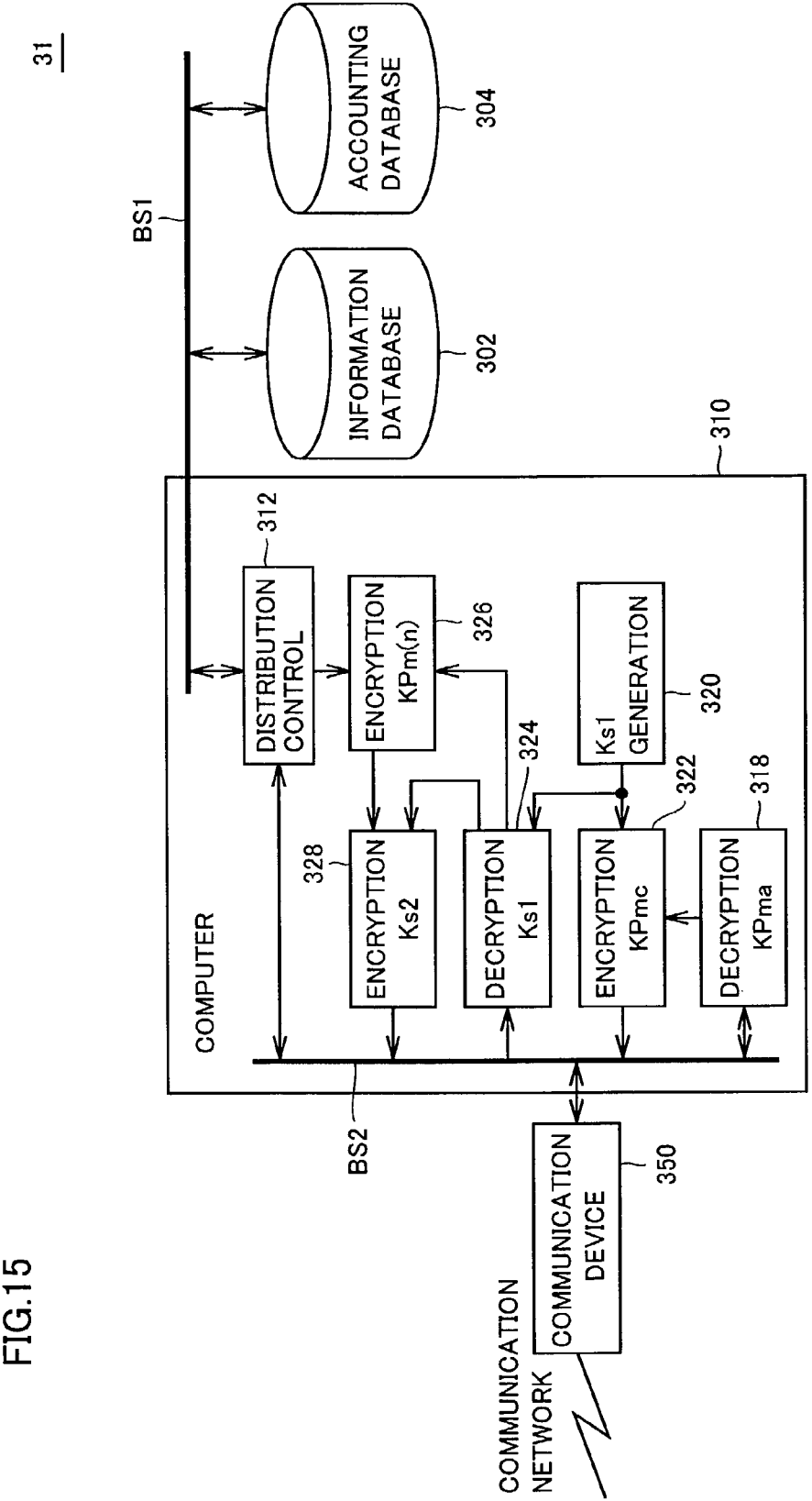
FIG. 15 is a schematic block diagram showing a structure of a license server 31 in the third embodiment.

FIG. 15 is a schematic block diagram showing a structure of a license server 31 of the third embodiment, and corresponds to FIG. 3 showing the first embodiment.

License server 31 in the third embodiment differs from license server 10 in the first embodiment only in that key Kcom is not employed. Therefore, the same portions bear the same reference numbers, and description thereof is not repeated.

Figure 16:
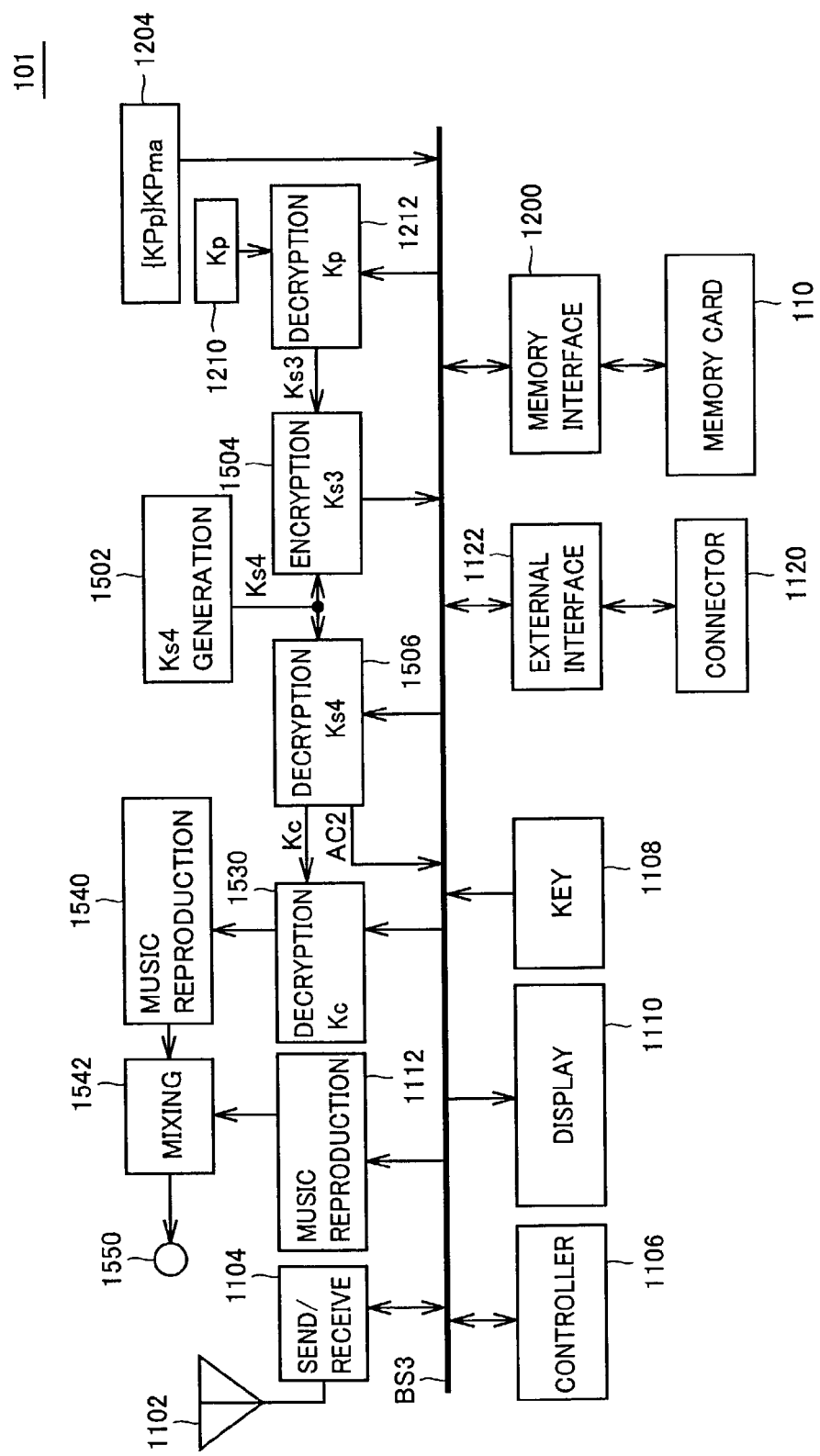
FIG. 16 is a schematic block diagram showing a structure of a cellular phone 101 in the third embodiment.

FIG. 16 is a schematic block diagram showing a structure of a cellular phone 101 of the third embodiment, and corresponds to FIG. 4 showing the first embodiment.

Cellular phone 101 in the third embodiment differs from cellular phone 100 in the first embodiment only in that key holding portion 1510 and decryption processing portion 1520 are eliminated because key Kcom is not employed. Therefore, the same portions bear the same reference numbers, and description thereof is not repeated.

The operation of copying data from CD-ROM 200 in the data distribution system of the third embodiment is substantially the same as that of the first embodiment.
[License Purchasing (Distributing) Operation]

Figure 17:
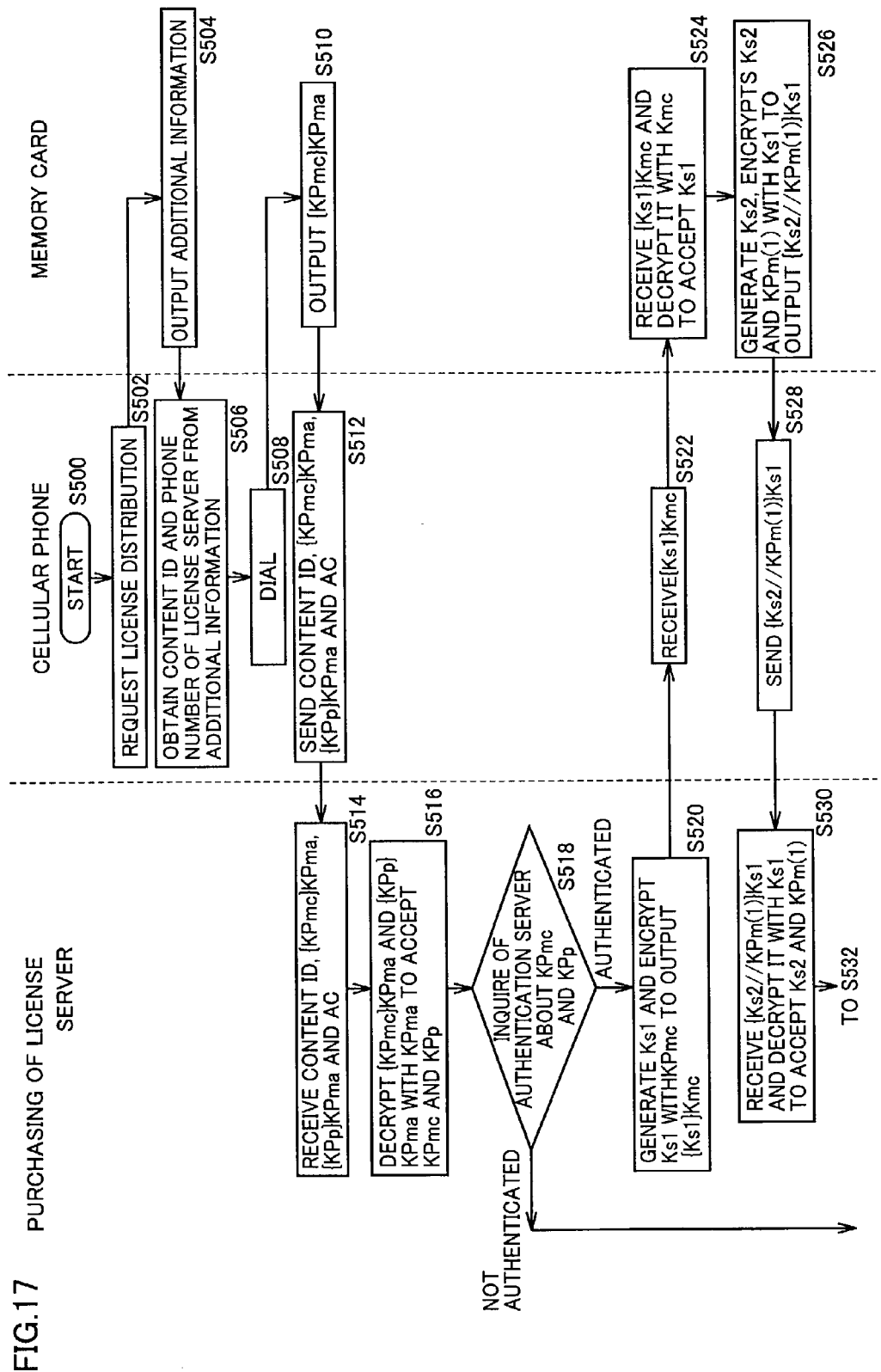
FIG. 17 is a first flowchart representing an operation of distributing license information data and others to cellular phone 101 over a cellular phone network.
Figure 18:
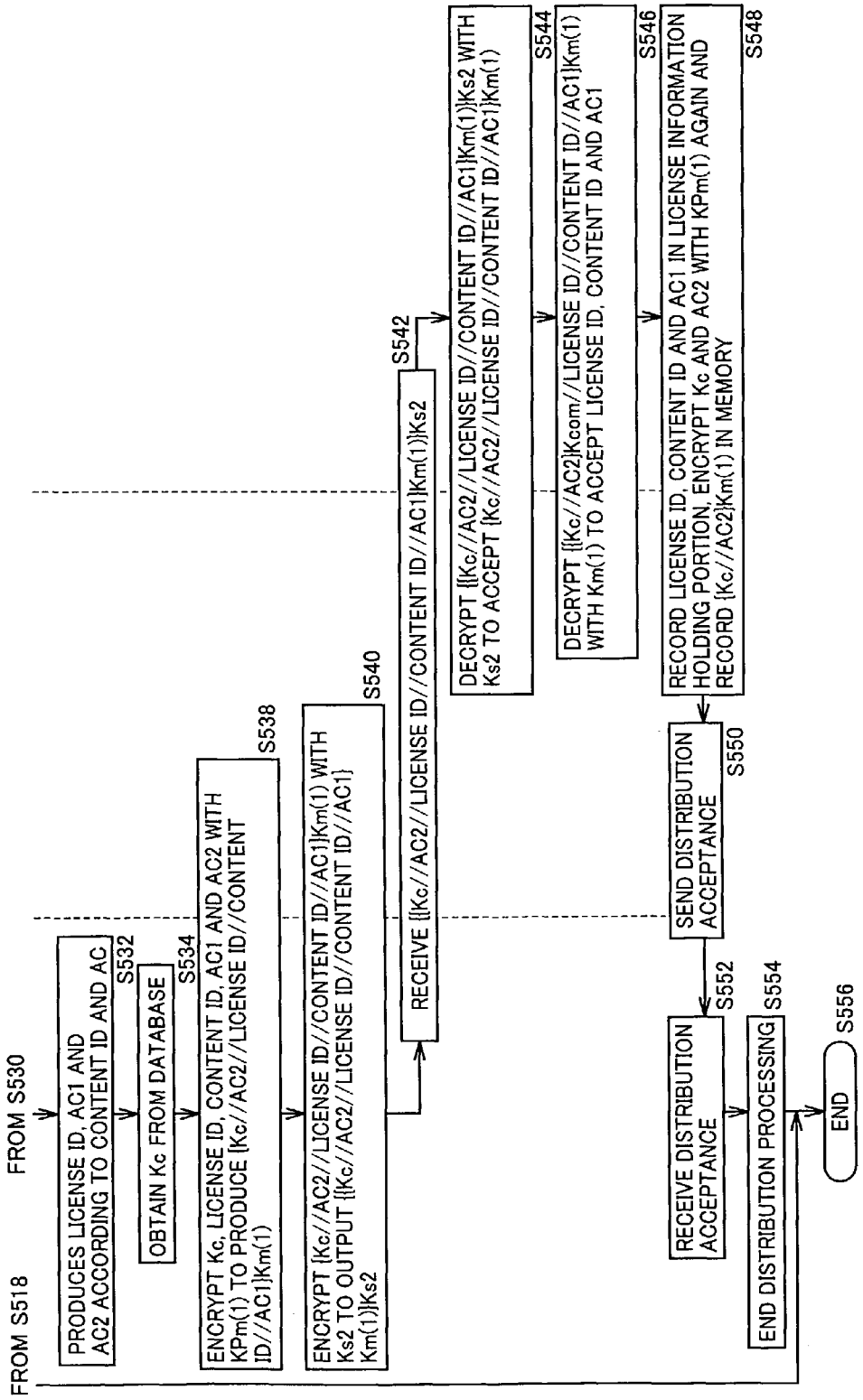
FIG. 18 is a second flowchart representing an operation of distributing the license information data and others to cellular phone 101 over the cellular phone network.

FIGS. 17 and 18 are first and second flowcharts for representing an operation of distributing the license information data and others, which are used for reproducing the encrypted music data, to cellular phones 101 over the cellular phone network in the data distribution system shown in FIGS. 15 and 16.

More specifically, FIGS. 17 and 18 represent an operation, in which memory card 110 of user 1 receives the license information data distributed from license server 31.

When the distribution processing starts (step S500), user 1 applies the license distribution request to cellular phone 101 via keys or buttons on touch key unit 1108 (step S502).

In response to this distribution request, memory card 110 outputs additional information data Data-inf corresponding to the encrypted music data already read from CD-ROM 200 (step S504).

In cellular phone 101, the content ID for designating the content to be distributed and a telephone number of the license server are obtained from the additional information (step S506), and the telephone number of license server 31 is dialed (step S508).

Memory card 110 sends data {KPmc}KPma from KPmc holding portion 1302 to cellular phone 101 (step S510).

Cellular phone 101 sends to license server 31 the content ID and data {KPmc}KPma obtained from memory card 110 as well as key {KPp}KPma sent from key holding portion 1204 of cellular phone 101 and information AC, which indicates the request applied for the license from the user side (step S512).

Information AC includes information of a request relating to the form or type of license purchase, and more specifically includes, for example, a request for allowance of predetermined times of reproduction operations, or a request for unrestricted reproduction.

When license server 31 receives content ID, data {KPmc}KPma and data {KPp}KPma, and information AC from cellular phone 101 (S514), decryption processing portion 318 decrypts received data {KPmc}KPma and data {KPp}KPma based on public authentication key KPma to accept keys KPmc and KPp (step S518).

License server 31 sends an inquiry to authentication server 12 based on keys KPmc and KPp thus obtained (step S518), and the processing moves to a next step if the distribution is to be made to the regular cellular phone and the regular memory card (step S520). If the regular cellular phone and the regular memory card are not used, the processing ends (step S556).

When it is determined, as a result of the inquiry, that the regular cellular phone and the regular memory card are used, license server 31 operates to produce session key Ks1 by session key generating portion 320. Further, encryption processing portion 322 in license server 31 encrypts session key Ks 1 with received public encryption key KPmc to produce data {Ks1}Kmc, and communication device 350 sends encrypted data {Ks1}Kmc received from encryption processing portion 322 to cellular phone 101 over the communication network (step S520).

When cellular phone 101 receives data {Ks1}Kmc (step S522), decryption processing portion 1306 in memory card 110 decrypts the data, which is sent onto data bus BS3 via memory interface 1200, with private decryption key Kmc, and thereby extracts decrypted session key Ks1 (step S524).

In the subsequent distributing operation, select switch 1320 is in the position closing contact Pa, and encryption processing portion 1340 receives session key Ks1 from decryption processing portion 1306 via contact Pa. Further, session key generating portion 1312 generates session key Ks2. Encryption processing portion 1340 receives session key Ks2 and public encryption key KPm(1) sent from KPm (1) holding portion 1310 via select switches 1314 and 1330, respectively, and encrypts them with session key Ks1 to produce data {Ks2//KPm(1)}Ks1 (step S526).

Cellular phone 101 sends data {Ks2//KPm(1)}Ks1 encrypted by encryption processing portion 1340 to license server 31 (step S528).

In license server 31, data {Ks2//KPm(1)}Ks1 is received by communication device 350, and is sent onto data bus BS2. Decryption processing portion 324 decrypts this data {Ks2//KPm(1)}Ks1 with session key Ks1 so that session key Ks2 and public encryption key KPm(1) are extracted in the decrypted forms (step S530).

In accordance with the content ID and information AC, distribution control portion 312 then produces the license ID and first and second control information data AC1 and AC2 based on the data held in distribution information database 302 and others (step S532).

Further, license server 31 obtains content decryption key Kc from distribution information database 302 (step S534).

In license server 31, encryption processing portion 326 encrypts data {Kc//AC2}Kcom, license ID, content ID and first control information data AC1 with public encryption key KPm(1) to produce {Kc//AC2//license ID//content ID//AC1}Km(1) (step S538).

Further, encryption processing portion 328 encrypts data {Kc//AC2//license ID//content ID//AC1}Km(1) with session key Ks2 to produce data {{Kc//AC2//license ID//content ID//AC1}Km(1)}Ks2, and sends it to cellular phone 101 via communication device 350 (step S540).

When cellular phone 101 receives data {{Kc//AC2//license ID//content ID//AC1}Km(1)}Ks2 (step S542), memory card 110 first operates to decrypt received data {{Kc//AC2//license ID//content ID//AC1}Km(1)}Ks2 by decryption processing portion 1356 so that data {Kc//AC2//license ID//content ID//AC1}Km(1) is accepted (step S544).

Then, in memory card 110, decryption processing portion 1416 decrypts data {Kc//AC2//license ID//content ID//AC1}Km(1) with private decryption key Km(1) to accept content decryption key Kc, second control information data AC2, license ID, content ID and first control information data AC1 (step S546).

License ID, content ID and first control information data AC1 are stored in license information holding portion 1500, and content decryption key Kc and second control information data AC2 are encrypted again with key KPm(1) by encryption processing portion 1418 to produce data {Kc//AC2}Km(1), which is stored in memory 1410 (step S548).

When an operation of storing data {Kc//AC2}Km(1) in memory 1410 ends, cellular phone 101 sends "distribution acceptance" to license server 31 (step S550).

When license server 31 receives the "distribution acceptance" (step S552), license server 31 performs distribution ending processing (step S554), e.g., by storing the accounting data of the owner of cellular phone 101 in accounting database 304, and the distribution processing ends (step S556).

Through the above operations, the data can be transmitted between memory card 110 and license server 31 after being encrypted with the session keys generated by memory card 110 and license server 31, and memory card 110 enters the state, in which the music data can be reproduced.

In the above description, the server performs the authentication processing with signed data {KPp}KPma sent from key holding portion 1204 of cellular phone 101 in steps S512-S518, similarly to the former description. In another system, however, the terminal for receiving the distributed data may be different from the device for data reproduction. In this case, the authentication processing with signed data {KPp}KPma may be eliminated while leaving the authentication processing with signed data {KPmc}KPma on the memory card side.

[Reproducing Operation]

Figure 19:
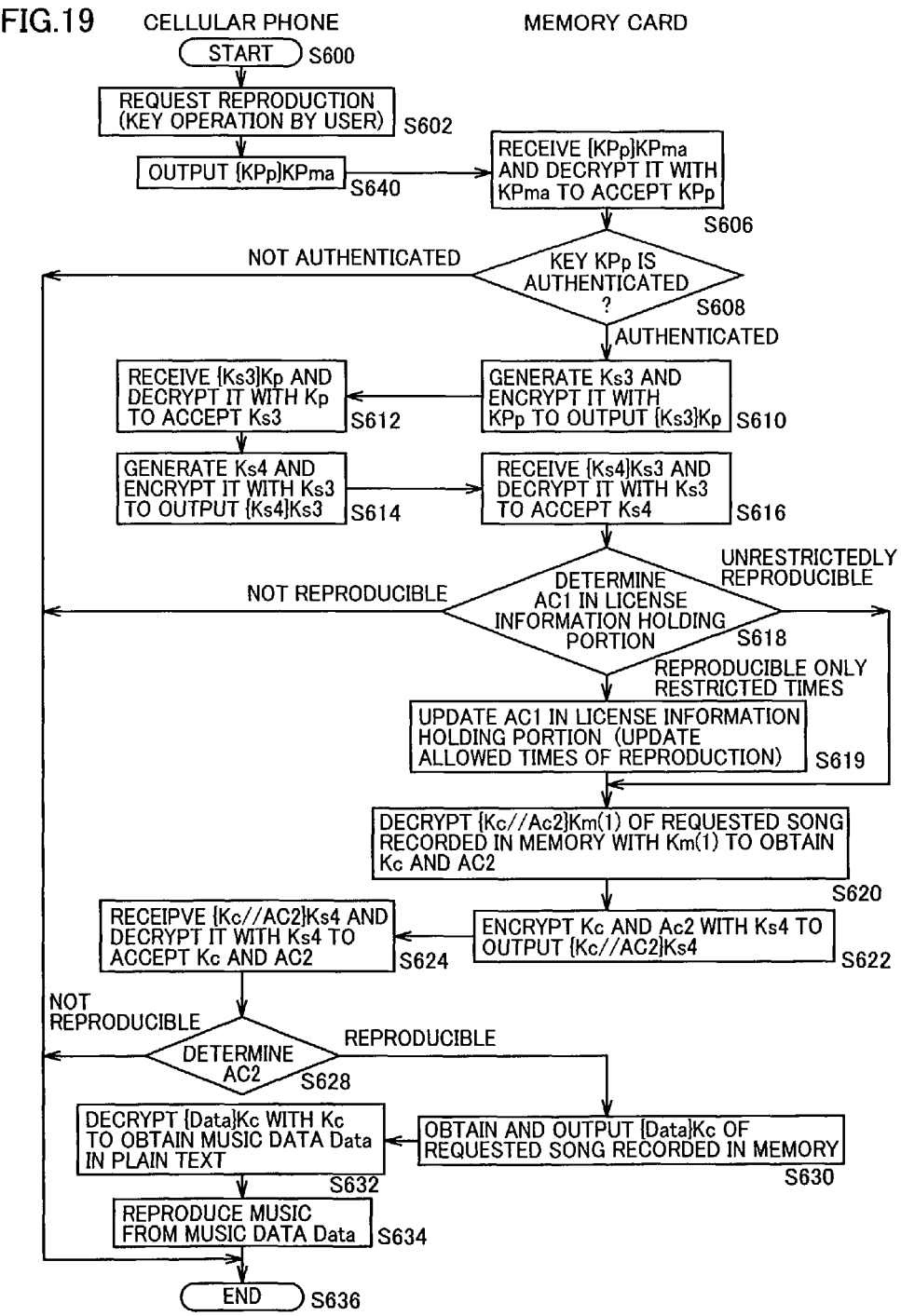
FIG. 19 is a flowchart representing reproduction processing for decrypting music data in cellular phone 101 and externally outputting it as music.

FIG. 19 is a flowchart representing the reproduction processing performed in cellular phone 101 for decrypting encrypted music data {Data}Kc held in memory card 110 to produce the decrypted music data, and externally reproducing music therefrom.

Referring to FIG. 19, when the reproduction processing starts (step S600), the reproduction request is applied in response to the instruction of user 1, which is entered via keyboard 1108 or the like of cellular phone 101 (step S602). Thereby, cellular phone 101 operates to output signed data {KPp}KPma from key holding portion 1204 to memory card 110 (step S604).

In memory card 110, decryption processing portion 1352 decrypts signed data {KPp}KPma to accept public encryption key KPp (step S606).

When the key can be authenticated, session key generating portion 1312 of memory card 110 generates session key Ks3, and encryption processing portion 1354 encrypts session key Ks3 with extracted public encryption key KPp to produce data {Ks3}KPp, and sends it to cellular phone 101 (step S610).

When it is determined that the key can be authenticated, and memory card 110 sends data {Ks3}KPp, cellular phone 101 decrypts data {Ks3}KPp received from memory card 110 by decryption processing portion 1212, and accepts session key Ks3 (step S612).

Session key generating portion 1502 in cellular phone 101 produces session key Ks4, and encryption processing portion 1504 encrypts session key Ks4 with session key Ks3 to produce data {Ks4}Ks3, and sends it to memory card 110 via data bus BS3 (step S614).

Memory card 110 receives data {Ks4}Ks3 produced and encrypted by cellular phone 101 via data bus BS3, and decryption processing portion 1356 decrypts it with session key Ks3 to extract session key Ks4 (step S616).

In memory card 110, controller 1420 determines whether the request is issued for the reproducible data or not, based on first control information data AC1 held by license information holding portion 1500, and also determines whether the allowed times of reproduction are restricted or not, if the data is reproducible (step S618). If the requested data is reproducible and the reproduction is allowed only restricted times, contents of first control information data AC1 in license information holding portion 1500 are updated to represent the remaining times of allowed reproduction (step S619). If it is determined that the data can be reproduced and the times of reproduction are not restricted, the processing moves to a step S620. When it is determined that the data cannot be reproduced, the processing ends (step S636).

In memory card 110, encrypted data {Kc//AC2}Km(1) corresponding to the requested song is read out from memory 1410, and is decrypted by decryption processing portion 1416 so that content decryption key Kc and second control information data AC2 are obtained (step S620).

Further, encryption processing portion 1340 encrypts content decryption key Kc and second control information data AC2 applied from data bus BS5 via select switch 1330 with session key Ks4 applied from decryption processing portion 1356 via select switch 1320, and outputs data {Kc//AC2}Ks4 thus encrypted to cellular phone 101 via data buses BS4 and BS3 (step S622).

Decryption processing portion 1506 in cellular phone 101 performs decryption with session key Ks4 to obtain content decryption key Kc and second control information data AC2 (step S624).

Controller 1106 in cellular phone 101 determines contents of second control information data AC2 (step S628), and ends the processing when the data is not reproducible (step S636).

When the data is reproducible, controller 1106 in cellular phone 101 controls memory card 110 so that encrypted music data {Data}Kc corresponding to the requested song stored in memory card 1410 of memory card 110 is read and output (step S630).

Music reproducing portion 1540 in cellular phone 101 decrypts encrypted music data {Data}Kc with extracted content decryption key Kc to produce the music data in plain text (step S632), and reproduces the content data to apply it to selector portion 1542 (step S634). Selector portion 1542 externally outputs the reproduced music, and the processing ends (step S636).

The processing in steps S604-S612 is not necessarily required for every reproducing operation, and may be performed when the memory card is inserted or the power is turned on.

Owing to the above structure, music content information can be easily supplied to the user, who can transmit the data over the information communication network such as a cellular phone network, while securing the copyright, and the user can start the reproduction of music in a short time.

Further, it is possible to prevent unconditional reproduction and duplication of the distributed data protected by copyright without authorization by the copyright owner.

It is likewise possible to eliminate key Kcom in the structure of the second embodiment employing memory card drive device 500 already described.

According to the description of the third embodiment, content decryption key Kc and second control information data AC2 in the license information data (license ID, content decryption key Kc, and first and second control information data AC1 and AC2) are recorded in memory 1410 after being encrypted. However, the invention is not restricted to the above, and such a structure may be employed that all the license information data are stored in license information holding portion 1500 without re-encryption in the memory card.

In the structure of the third embodiment, therefore, if license information storing portion 1500 stores all the license information data, encryption processing portion 1418 is not required in the structure of memory card 110. Further, the processing in step S548 shown in FIG. 18 is changed into processing, which is performed to "store content decryption key Kc, second control information data AC2, license ID, content ID and first control information data AC1 in license information holding portion 1500". Further, the processing in step S620 shown in FIG. 19 is changed into processing, which is performed to "obtain content decryption key Kc and second control information data AC2 of the requested song stored in license information holding portion 1500".

If an internal mechanism of the memory card is formed of one-chip LSI or the like, a portion of memory 1410 may be used as license information holding portion 1500 so that license information holding portion 1500 thus formed may store the license information data.

Description has been given on the embodiments, which use CD-ROMs for distributing the content data such as music data. However, the invention is not restricted to this structure, and can be generally applied to various structures, in which content data is distributed in the form recorded on various record mediums. The record mediums may be other disk-like record mediums such as a DVD-ROM (Digital Versatile Disc Read Only Memory), although not restricted thereto.

Although the present invention has been described and illustrated in detail, it is clearly understood that the same is by way of illustration and example only and is not to be taken by way of limitation, the spirit and scope of the present invention being limited only by the terms of the appended claims.

The invention claimed is:

1. A distribution server for receiving encrypted content data and plain-text additional information data for obtaining decryption information data for use in decryption processing of the encrypted content data from a record medium bearing said encrypted content data and said plain-text additional information data, and distributing said decryption information data to a plurality of terminal devices each storing said decryption information data received over an information transmission network, comprising:

a send/receive portion specified based on said plain-text additional information data, and coupled to said information transmission network to allow access from each of said terminal devices; and encrypting and distributing means for receiving a distribution request for said decryption information data sent from each of said terminal device and a first key sent from the data storing portion attached to said terminal device, encrypting said decryption information data with said first key, and distributing the encrypted decryption information data to the terminal device sending said distribution request via said send/receive portion and over said information transmission network.

2. The distribution server according to claim 1, wherein said encrypting and communicating means includes:

a session key generating portion for producing a first symmetric key to be updated upon every distribution of said decryption information data, a session key encryption processing portion for encrypting said first symmetric key with a first public encryption key decodable by said terminal device sending said distribution request, and applying the encrypted first symmetric key to said first interface portion, a session key decryption processing portion for decrypting the data returned from said terminal device sending said distribution request after being encrypted with said first symmetric key, a first decryption information data encryption processing portion for encrypting said decryption information data with said second public encryption key extracted from the data decrypted by said session key decryption processing portion and being unique to said terminal device sending said distribution request, and a second decryption information data encryption processing portion for encrypting the output of said first decryption information data encryption processing portion with said second symmetric key extracted from the data decrypted by said session key decryption processing portion and produced in response to every distribution of said decryption information data by said terminal device sending said distribution request, and applying the encrypted output to said first interface portion for distribution.

3. The distribution server according to claim 2, wherein said first public encryption key is sent, as authentication data allowing authentication by decryption with an authentication key, in response to each of said distribution requests applied from said terminal devices;

said encrypting and distributing means includes:

an authentication key holding portion for holding said authentication key, and an authentication processing portion for verifying a validity of said authentication data by decrypting said authentication data sent from each of said terminal devices with said authentication key held by said authentication key holding portion, thereby determining whether said decryption information data can be distributed to said terminal device sending said distribution request or not, and extracting said first public encryption key; and said decryption information data is distributed to said terminal device sending said distribution request when it is determined based on said authentication processing that said decryption information data can be distributed.

4. A terminal device for receiving encrypted content data and plain-text additional information data for obtaining decryption information data for use in decryption processing of the encrypted content data from a record medium bearing the encrypted content data and the plain-text additional information data, storing the received the content data and the plain-text additional information data, and receiving said decryption information data from a distribution server over an information transmission network, comprising:

a data storing portion for receiving said encrypted content data and said plain-text additional information data from said record medium for duplication and storage, receiving said decryption information data to store said decryption information data, and being removably attached to said terminal device;

an interface attached to said data storing portion for transmitting data to and from said data storing portion;

specifying means for specifying said distribution server based on said plain-text additional information data duplicated together with said encrypted content data for receiving said decryption information data for said encrypted content data stored in said data storing portion; and receiving means for transmitting the data to and from the distribution server specified by said specifying means over said information transmission network, and receiving said decryption information data, wherein said data storing portion includes:

first encrypting and communicating means for outputting a first key unique to said data storing portion in a write processing of receiving and storing said decryption information data from outside said data storing portion, and operating, in a read processing of outputting said stored decryption information data to outside said data storing portion, to receive a second key from a providing party providing said stored decryption information data, and to encrypt and output at least a portion of said stored decryption information data, first storing means for storing said encrypted content data and said plain-text additional information data, and second storing means for storing said decryption information data.

5. The terminal device according to claim 4, wherein said data storing portion is a memory card.

6. The terminal device according to claim 4, wherein said decryption information data includes a content decryption key for decrypting said encrypted content data;

said second key is unique to said content data reproducing means;

said terminal device further comprises content data reproducing means; and said content data reproducing means includes:

second encrypting and communicating means for outputting said second key, receiving said content decryption key encrypted with said second key from said data storing portion, and decrypting the received key to extract said content decryption key, decrypting means for decrypting said encrypted content data with said content decryption key extracted by said second encrypting and communicating means to output said content data, and reproducing means for reproducing information corresponding to said content data output from said decrypting means.

7. The terminal according to claim 6, wherein said decryption information data further includes second control information data for designating conditions of reproduction by said content data reproducing device, said second encrypting and communicating means receives said second control information data encrypted together with said content decryption key with said second key, and further extracts said second control information data, and said content data reproducing means further includes means for restricting the reproducing operation of said reproducing means in accordance with said second control information data extracted by said second encrypting and communicating means.

8. The terminal device according to claim 4, wherein said information transmission network is a digital cellular phone network;

said terminal device includes a cellular phone;

said cellular phone includes:

data input/output means capable of transmission of digital data for reception from a device outside said cellular phone for storing, in said data storing portion, said encrypted content data and said plain-text additional information data read from said record medium by said device outside said cellular phone, and content data reproducing means;

said decryption information data includes a content decryption key for decrypting said encrypted content data;

said second key is unique to said content data reproducing means; and said content data reproducing means includes:

third encrypting and communicating means for outputting said second key, receiving said content decryption key encrypted with said second key from said data storing portion, and decrypting the received content decryption key to extract said content decryption key, decrypting means for decrypting said encrypted content data stored in said data storing portion with said content decryption key extracted by said third encrypting and communicating means, and outputting said content data, and reproducing means for reproducing corresponding information from said content data output from said decrypting means.

9. A memory card drive device for transferring, to a memory card, data read from a record medium bearing encrypted content data, plain-text additional information data, specifying data for specifying a plurality of predetermined unique keys and decryption information data encrypted into a decodable form with the unique key corresponding to said specifying data, comprising:

a unique key holding portion for holding the plurality of unique keys selectively designated by said specifying data; and a unique key decryption processing portion for decrypting said encrypted decryption information data obtained from said record medium with the unique key included in said plurality of unique keys and corresponding to said specifying data obtained from said record medium, and accepting the decryption information data, wherein said accepted decryption information data is transferred to said memory card based on the fact that at least said memory card drive device can accept said decryption information data.

10. A disk-like record medium for use in a data distribution system for distributing encrypted content data to a plurality of users, and distributing decryption information data to be used for decryption of said encrypted content data over an information transmission network, comprising:

a first region bearing said encrypted content data;

a second region bearing additional information data in plain text providing information for obtaining said decryption information data to be used for the decryption of said encrypted content data;

a third region bearing specifying data for specifying the plurality of unique keys predetermined in said data distribution system; and a fourth region bearing said decryption information data restricting reproduction of said encrypted content data corresponding to said encrypted content data encrypted into a decodable form with the unique key corresponding to said specifying data.

11. The record medium according to claim 10, wherein said record medium is a CD-ROM.

12. The record medium according to claim 10, wherein said record medium is a DVD-ROM.

* * * * *